United States Patent [19]
Osborn, Jr. et al.

[11] Patent Number: 5,873,694
[45] Date of Patent: Feb. 23, 1999

[54] METHOD AND APPARATUS FOR LIFTING A LOAD

[76] Inventors: Thomas H. Osborn, Jr., Box 572, Holdenville, Okla. 74848; Virgil D. Gann, Rte. 1 Box 63, Lamar, Okla. 74850

[21] Appl. No.: 840,018

[22] Filed: Apr. 24, 1997

[51] Int. Cl.$^6$ ........................................... B66F 9/06
[52] U.S. Cl. ........................ 414/815; 414/24.5; 414/703; 414/920
[58] Field of Search .................................... 414/800, 815, 414/24.5, 703, 721, 911, 920, 631, 632, 637

[56] References Cited

U.S. PATENT DOCUMENTS

| | | | |
|---|---|---|---|
| 2,973,876 | 3/1961 | Voss | 414/721 X |
| 3,826,392 | 7/1974 | Farley | 414/703 X |
| 4,264,252 | 4/1981 | Jennings et al. | 414/24.5 |
| 5,556,245 | 9/1996 | Moss | 414/920 X |

FOREIGN PATENT DOCUMENTS

| | | | |
|---|---|---|---|
| 81951 | 9/1956 | Denmark | 414/703 |
| 4142613 | 6/1993 | Germany | 414/920 |
| 20572 | 2/1983 | Japan | 414/703 |
| 20573 | 2/1983 | Japan | 414/703 |
| 71271 | 4/1983 | Japan | 414/703 |
| 185836 | 10/1983 | Japan | 414/703 |
| 144045 | 2/1954 | Sweden | 414/703 |
| 1555758 | 11/1979 | United Kingdom | 414/703 |

OTHER PUBLICATIONS

Loaders, Spreaders and Blades John Deere Nov. 1994 19.
Newspaper ad for Tractor Bale Spike ? 1.

*Primary Examiner*—David A. Bucci
*Attorney, Agent, or Firm*—Thomas R. Weaver

[57] ABSTRACT

This invention provides an apparatus and a method of using the apparatus to lift and transport a bulky load, such as a round bale of hay. The apparatus of the invention is a planar frame equipped with sliding block adapted to contact and maintain the load to be lifted against the frame during lift and transport. The frame is further equipped with a cable and associated sheave and attachment means adapted to cause the sliding block to move or not to move relative to the frame upon movement of the frame relative to a support, such as the ground depending upon the method of anchoring the cable. The frame is still further equipped with sites adapted for lifting/rotatable attachment to a 3-point lifting device, such as a farm tractor, having the capability to lift the apparatus and load. The frame and load, upon being lifted by the 3-point lifting device, can either tilt toward or away from the 3-point lifting device or can rise vertically depending the method of attachment of the apparatus to the 3-point lifting device.

20 Claims, 7 Drawing Sheets

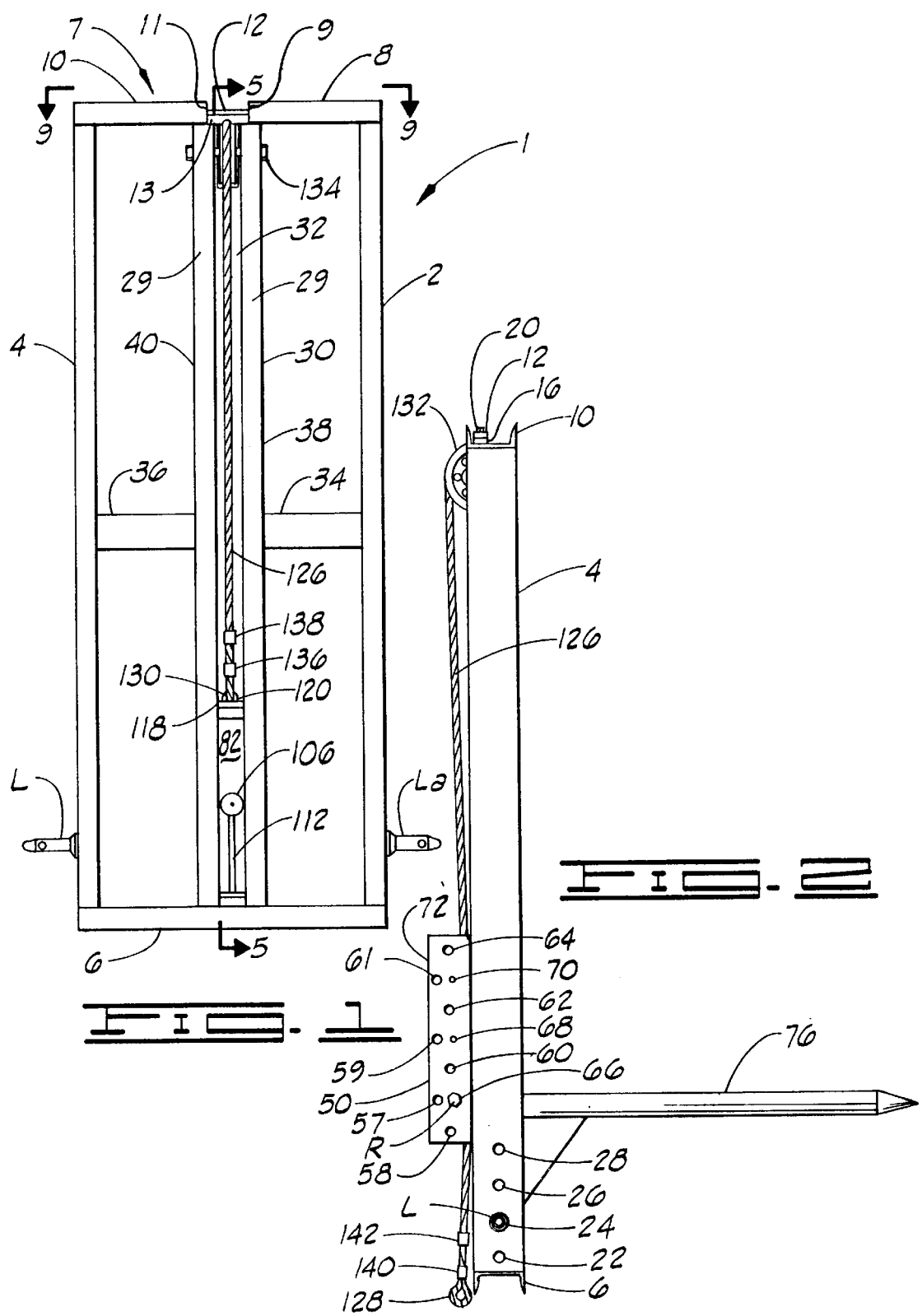

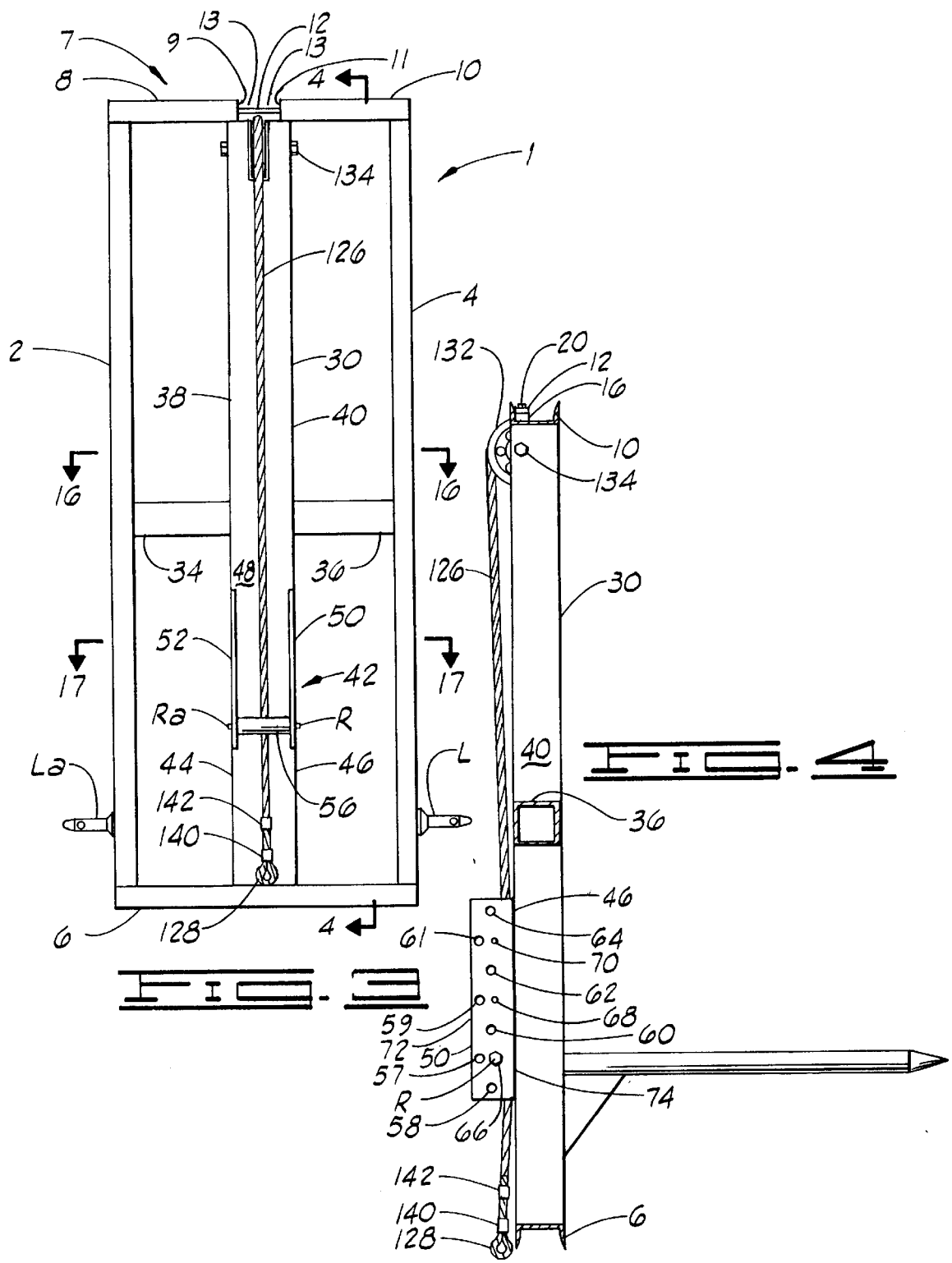

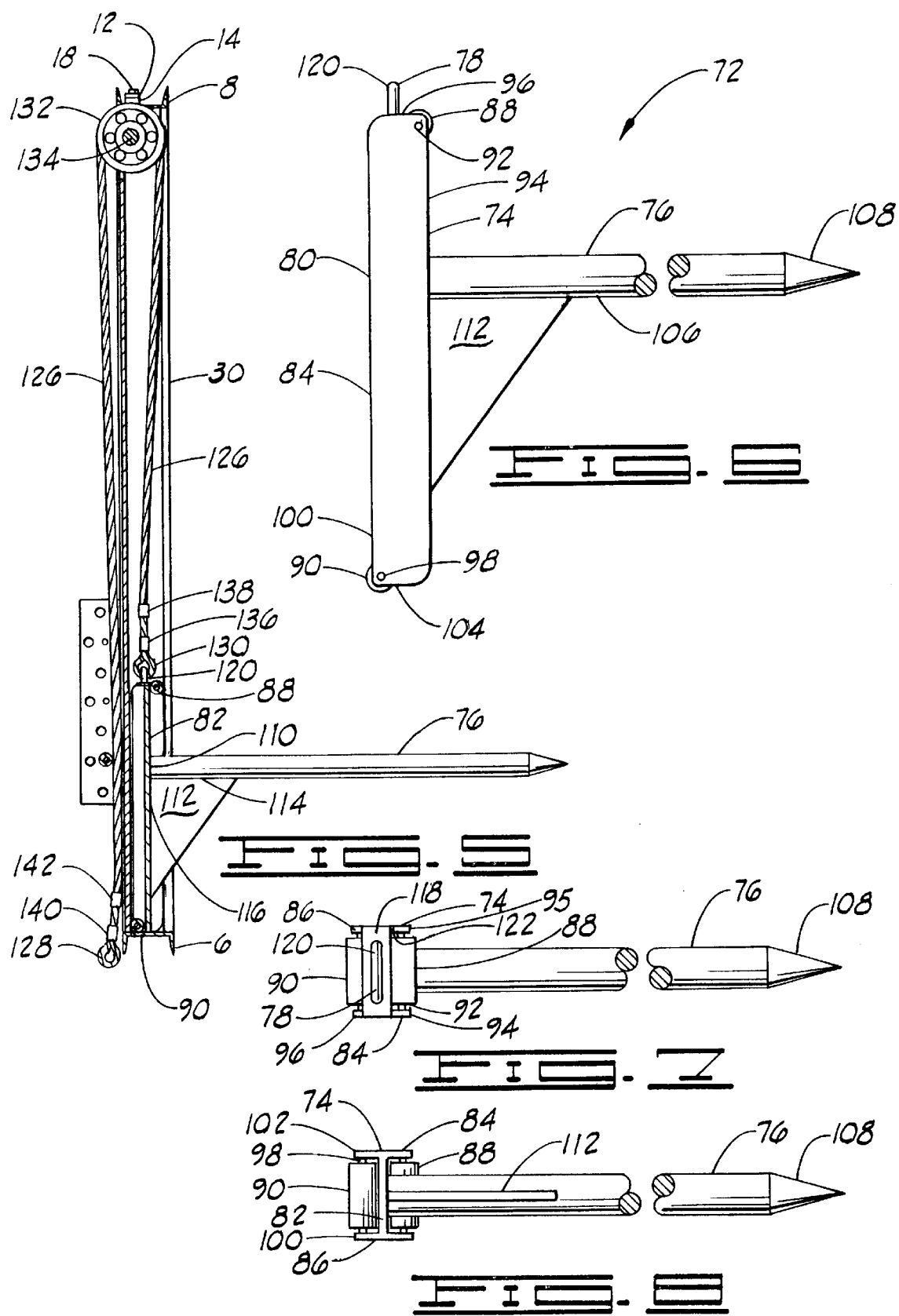

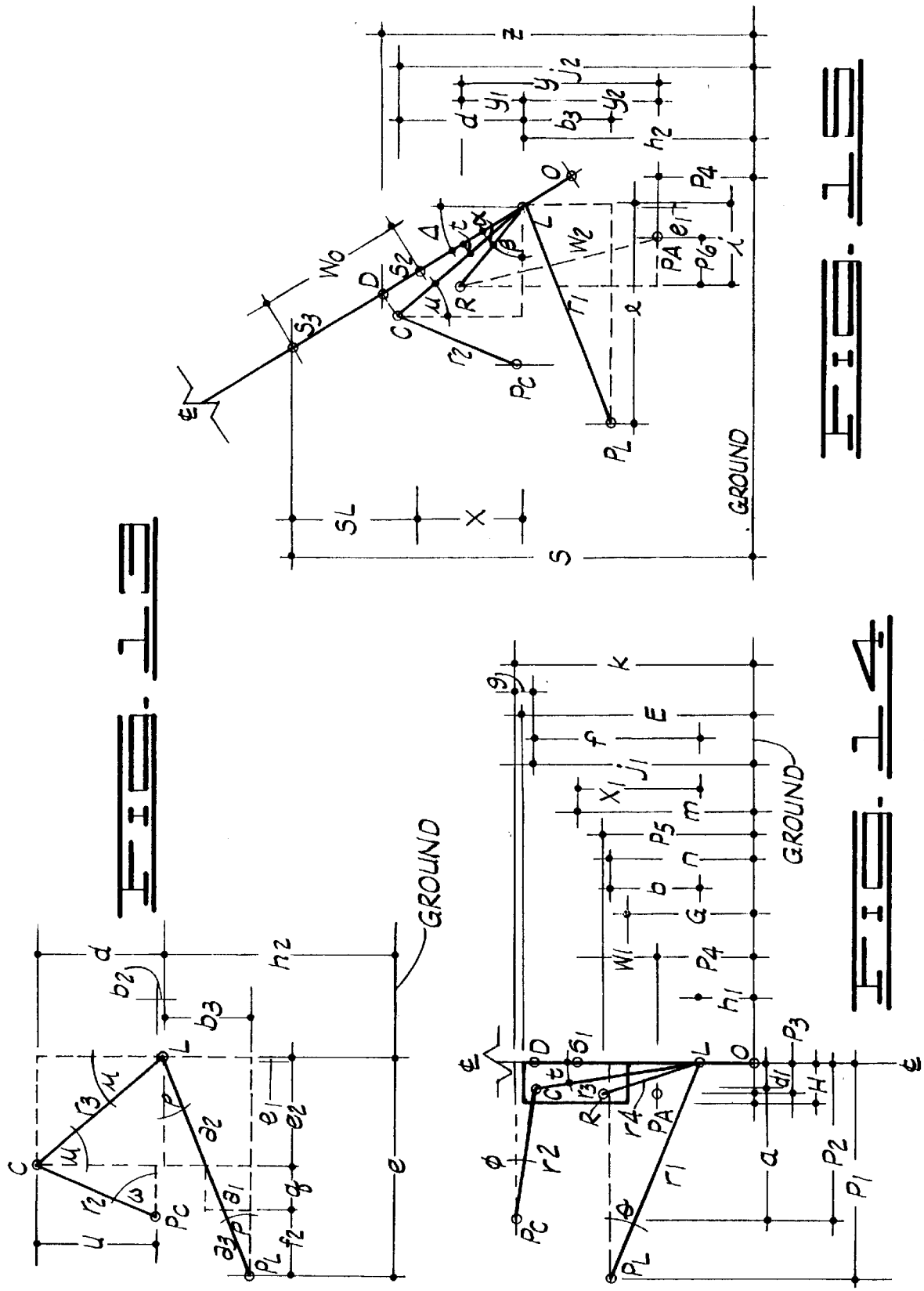

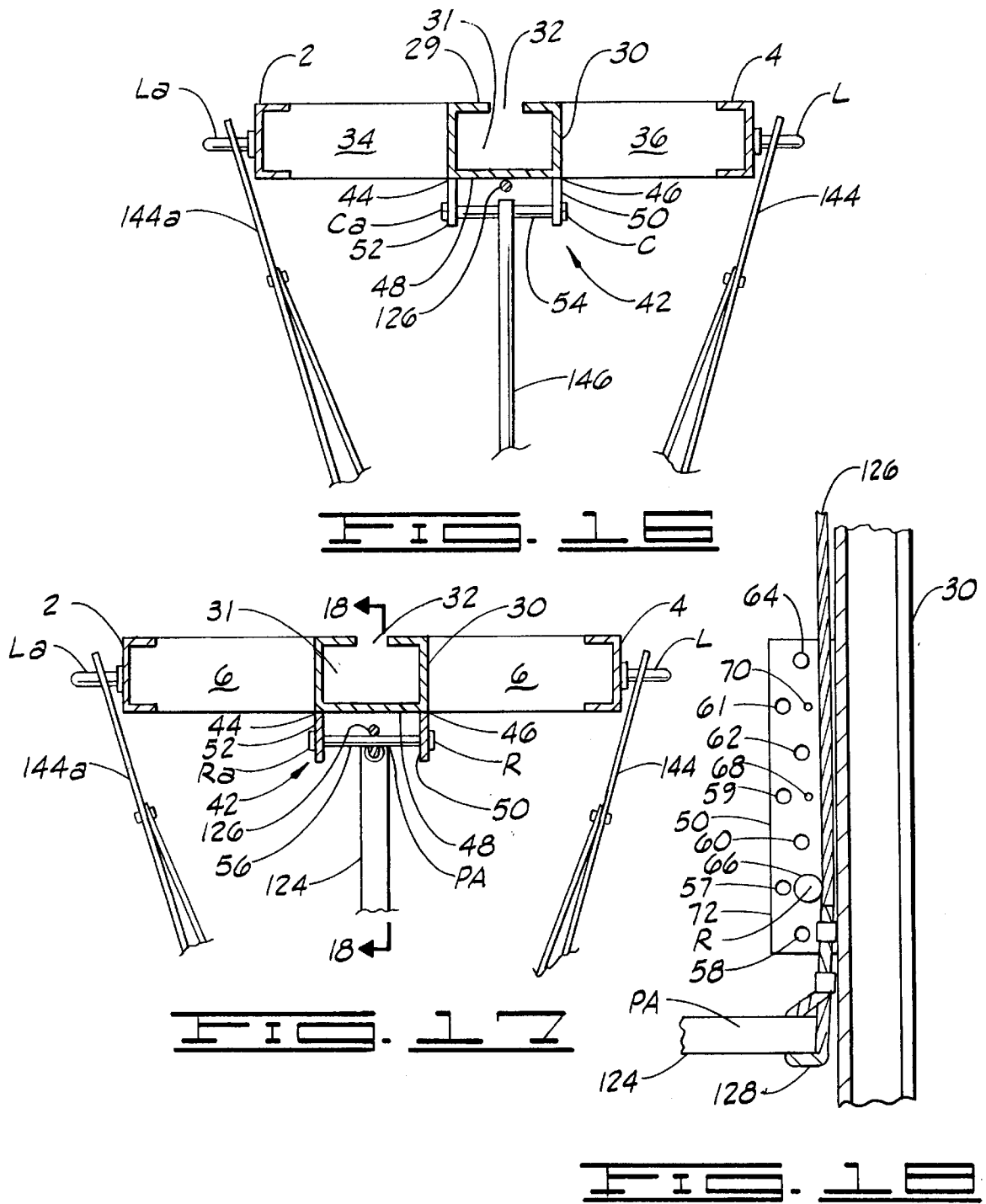

5,873,694

METHOD AND APPARATUS FOR LIFTING A LOAD

BACKGROUND OF THE INVENTION

1. Technical Field of the Invention

This invention broadly relates to an apparatus for and methods of lifting a load. The invention more particularly relates to lifting a load which occupies a relatively large volume in relation to the weight thereof, wherein the density of such a load is generally considered to be "low". Such loads are sometimes referred to as being "bulky." Accordingly, this invention is useful to lift bulky loads which are difficult to handle more due to the fact of the volume and shape of the load rather than due to the weight thereof. This invention still more particularly relates to an apparatus and to methods of using the apparatus for lifting a bulky load positioned at one location and then transporting the load to and placing it an another location.

2. Description of the Prior Art and Problems Solved

A farm crop which is grown in virtually every agricultural area of the United States and, indeed, throughout the entire world, is hay or some other type of discrete grass or fodder material. The hay, to be useful, is ordinarily severed from the land and then bundled in the field into compact forms which are then lifted in the field, in the bundled form, and transported, as such, to some remote location for storage and subsequent use. The uses, which are not a part of this invention, are well known to include animal feed, bedding, plant mulch as well as a number of other uses. It is important to realize that the farmer who grows the crop of hay cannot ordinarily receive revenue or value from it unless it is first moved from the field and placed in a storage location by utilizing some method which is simple and, preferably, economically attractive.

Methods of severing, i.e. cutting, hay in the field are well known in the art. It is also known to sweep, i.e. rake, the cut hay into windrows to facilitate the drying thereof and, thereafter, to gather the windrows and compress the hay into bundles called bales for subsequent removal from the field. Some bales, i.e. "small bales", exist in a shape and weight which permit a person to physically lift and handle them without resort to mechanical lifting apparatus. However, due, perhaps, to lack of sufficient labor force and/or economies of scale, it has become the practice to form bales which are of such large volume and weight that the lifting and movement thereof requires the use of specialized equipment. In some cases, the large bales are cylindrical in shape, have a diameter in the range of from about 48 to about 50 inches, or more, a length of 4 to 5 feet and weigh in the range of from about 800 to about 1000 pounds. Such bales are known as "round" bales. Other large bales of similar weight are cubical in shape and are called "square" bales. Such large bales are the equivalent in weight to about 10 to 20 small bales.

The prior art has developed apparatus for lifting and transporting large bales. Such apparatus, referred to as "loaders", are designed to be employed at the front end of a field work vehicle, such as a farm tractor. Loaders generally feature a structure comprising two boom arms, each pivoted at the proximal end thereof to the middle of the tractor chassis, a frame, which is hinged at its bottom to the distal end of each boom arm, and a spike rigidly attached to the frame. It is apparent from the description of the loader that the spike does not slide on, or otherwise move relative to, the frame. The spike is of sufficient length and diameter to completely pierce the bale. The weight of the bale is thus transferred from spike to frame to boom arms to chassis to ground. In the prior art apparatus, the boom arms are connected to hydraulic rams which are solely dedicated to lifting and lowering the boom arms relative to the chassis, and the frame is connected to other hydraulic rams which are solely dedicated to rotating the frame about the above mentioned hinge at the distal ends of the boom arms. In operation, the prior art apparatus described requires the frame to be independently lifted from the ground by the boom arms, and the frame to be independently rotated around the mentioned hinge. The frame must be rotated about the hinge because the ends of the boom arms, to which the frame is hinged, move in a curve. The frame is thus independently controlled to level the spike to help retain the bale on the spike during the lift and subsequent transport.

It is apparent that the above described prior art apparatus is not simple and requires the services of a skilled operator to manipulate the dedicated power sources to maintain proper control of the lift and leveling functions involved in a lift and transport operation.

Another prior art apparatus employs a planar frame having rigidly attached thereto a spike for piercing a bale. The frame is ordinarily mounted on a trailer which is pulled by a vehicle, such as a truck, or mounted on the truck itself. The frame of this type apparatus is hinged at the bottom thereof to the trailer or truck, such that upon the application of force to the frame, at a point above the hinge, the frame itself does not lift from the truck or trailer mounting, but does rotate about the hinge as an axis whereby the frame tilts to thereby cause the spike and bale to rotate and thus to lift the load from the ground. It is important to note that the base of the frame at the hinge is, at all times, in contact with the chassis support, i.e. the base of the frame does not break contact with the trailer or the truck. It is further to be noted that the spike does not slide on, or otherwise move relative to, the frame. The power source to supply the force to tilt the frame can be as complicated as a set of hydraulically operated rams or as simple as a hand-powered winch and cable system. The apparatus thus described is, mechanically, simple and easy to use, but rather limited in lifting operations. It is, accordingly, inexpensive as compared to the loader described previously.

There, accordingly, exists a need for an apparatus for and a method of lifting and moving bulky loads which is as useful as the prior art loader, but which does not require dedicated power sources or a skilled operator to manipulate complicated controls and which is as mechanically simple as the described truck mounted frame.

SUMMARY OF THE INVENTION

By this invention there is thus provided an apparatus for and a method of lifting a bulky load, such as a round bale of hay, which is resting at one location, such as the ground, and transporting the load to and placing it at another location.

The apparatus comprises a frame having associated therewith a load handling assembly, slidably connected to the frame for contacting and carrying the load, a load connector assembly, supported by the frame for supporting and moving the load handling assembly, lift pins attached to the frame for lifting the frame, and a guide pivot assembly, attached to the frame for guiding and stabilizing the frame and load during lift and transport.

The preferred method of using the frame to lift and transport a load features the employment of various different mechanical schemes of connecting the frame to a 3-point lifting apparatus of the type ordinarily available on farm tractors, in combination with various different mechanical schemes for connecting the load to an anchor, whereby the load can be lifted vertically or tilted toward or away from the 3-point connection. The method enables a load to be lifted, vertically by a net amount which is less than, equal to or greater than the net vertical lift of the frame itself as caused by the ordinary operation of the 3-point apparatus.

The frame is a flat, rigid, planar structure having a front side and a back side, a left side rail, a right side rail, a top rail, a bottom rail and a load support rail positioned in the plane of the frame intermediate the left side rail and the right side rail. A first lift pin is attached to the frame adjacent to the bottom of the left side rail at the outer surface thereof and preferably extends outwardly therefrom in the plane of the frame. A second lift pin is attached to the frame adjacent to the bottom of the right side rail at the outer surface thereof and preferably extends outwardly therefrom in the plane of the frame. The frame is, preferably, rectangular in shape.

The load support rail comprises a front side, a back side, an upper end, and a lower end. The front side of the load support rail and the front side of the frame face in the same direction. The lower end of the load support rail is perpendicular to the bottom rail of the frame and is rigidly attached thereto. An opening is formed between the front side and the back side of the upper end of the load support rail. In addition, the upper end of the load support rail is rigidly attached to the top rail of the frame.

The first lift pin and the second lift pin are positioned vertically below the opening between the front side and the back side of the load support rail and are, preferably, in horizontal alignment.

In one preferred embodiment, the load support rail is rectangular in cross section and has a front side, a back side and a hollow interior. The load support rail is positioned between, substantially parallel to and equidistant from the vertical left side and right side rails of the rectangular frame. A linear slot is cut into and completely penetrates the front side of the load support rail. The slot extends the full length of the load support rail from the top to the bottom thereof.

The load handling assembly, comprising a load mover having attached thereto a load carrier and a load attachment means, is slidably connected to the front side of the load support rail.

In the preferred embodiment, the above mentioned load mover comprises a load-carrying block, slidably placed in the rectangular hollow interior of the above mentioned load support rail. The load-carrying block further comprises rollers attached to the upper and lower ends thereof to facilitate movement of the block in the interior of the load support rail. The load attachment means, in the preferred embodiment, is a half-ring attached to the top of the load-carrying block to thereby form a bail. In the preferred embodiment, the load carrier comprises a spike rigidly attached to the front side of load-carrying block. The spike projects outwardly from the block through the above-mentioned slot which extends from the top to the bottom of the load support rail.

The load connector assembly, which operates in cooperation with the frame and an anchor to move the load handling assembly, comprises a flexible member having an anchor end and a load end. The flexible member extends from the front side of the load support rail to the back side of the load support rail by passing through the described opening formed between the front side and the back side of the upper end of the load support rail. The load end of the flexible member is connected to the load attachment means of the load handling assembly.

In the preferred embodiment, the flexible member is a cable. The load end of the cable is a loop which is formed by passing the end of the cable through the bail of the above mentioned load-carrying block. The cable end is then fastened against the standing portion of the cable above the bail by known means, such as cable clamps. Furthermore, a sheave, positioned transverse, i.e., perpendicular, to the plane of the frame, is preferably rotatably mounted in the opening formed between the front side and the back side of the upper end of the load support rail, whereby the cable, which passes through the said opening, is caused to travel over the sheave.

The guide pivot assembly, which guides and stabilizes the frame and load during lift and transport, is fixedly attached to the back side of the load support rail at a position intermediate the bottom rail of the frame and the opening in the upper end of the load support rail. The guide pivot assembly is comprised of at least one guide pin plate having removably connected thereto a guide pin.

In operation, the frame is initially positioned so that the bottom rail thereof rests on, but is not attached to, a support, such as the ground, and the backside of the frame faces a first fixed pivot, a second fixed pivot and a third fixed pivot. The first and second fixed pivots lie in a first horizontal plane and the third fixed pivot lies in a second horizontal plane wherein the first horizontal plane is intermediate the bottom rail support, hereinafter for convenience called the bottom plane, and the second horizontal plane. The plane of the frame intersects the first and second horizontal planes.

In a preferred embodiment the bottom plane is a horizontal surface, such as the ground, which is parallel to the first and second planes, and the plane of the frame, as hereinafter explained, is perpendicular to the first and second planes and the bottom plane.

A first lift arm, having a first end and a second end, is provided wherein the mentioned first end is rotatably attached to the first fixed pivot and the second end is rotatably attached to the first lift pin on the frame.

A second lift arm, having a first end and a second end, is provided wherein the mentioned first end is rotatably attached to the second fixed pivot and the second end is rotatably attached to the second lift pin on the frame.

A guide arm, having a first end, a second end and an adjusting means, such as a turnbuckle, for varying the distance between the first end and the second end, is provided wherein the mentioned first end is rotatably attached to the third fixed pivot and the second end is rotatably attached to the mentioned guide pin which is removably attached to the guide pin plate.

In a preferred embodiment, the guide pin is attached to the guide pin plate in a position intermediate the mentioned first and second horizontal planes and the distance between the first end and the second end of the guide arm is adjusted with the adjusting means until the plane of the frame is perpendicular to the first and second planes and the bottom plane.

In the preferred embodiment, as set out above, the perpendicular distance in the first horizontal plane from the first fixed pivot to the plane of the frame is equal to the perpendicular distance in the first horizontal plane from the second fixed pivot to the plane of the frame and the distance from the first fixed pivot to the third fixed pivot is equal to the distance from the second fixed pivot to the third fixed pivot. Furthermore, the perpendicular distance from the third fixed pivot to the plane of the frame is less than the perpendicular distance from the first (and the second) fixed pivot to the plane of the frame.

Finally, the flexible member is positioned to travel between the backside of the load support rail and the guide pin, and the anchor end of the flexible member is attached to a fixed anchor. In this regard, the fixed anchor can be a point whose position, upon lifting the frame, does not change relative to the positions of the first, second and third fixed pivots or it can be a point whose position, upon lifting the frame, does not change relative to the frame or it can be a combination of the two alternatives.

It is important to note that the distance between the load end and the anchor end of the flexible member is adjusted prior to the connection of the anchor end to the anchor such that the load carrier is positioned as desired to support the load to be lifted.

The load to be lifted is supported on the load carrier. Upward forces are then applied to the first and second lift pins, whereby the first and second lift pins are caused to rotate about the first and second fixed pivots by the first and second lift arms, and the guide pin is caused to rotate about the third fixed pivot by the guide arm, to thereby cause the load support rail to rise against the flexible member in the opening. The flexible member, being restrained from movement by the fixed anchor, causes the load handling assembly to move the load by an amount less than, equal to or greater than the movement of the first and second lift pins.

It has been discovered that the frame, upon being subjected to the applied upward forces, can be caused to rise substantially vertically, with substantially no frame tilt, or caused to rise and tilt towards or away from the fixed pivots depending upon the points of attachment of the lift pins and guide pin to the frame. For purposes of this disclosure, if the top rail of the frame tilts toward the fixed pivots, then the tilt is considered to be positive (+), but if the top rail of the frame tilts away from the fixed pivots, then the tilt is considered to be negative (−). Accordingly, by controlling frame tilt, one can control load tilt.

It has also been discovered that slidably, as distinguished from rigidly, attaching the load to the frame renders movement of the load relative to the frame dependent upon movement of the flexible member relative to the frame. In this regard, if the fixed anchor is the frame itself, i.e. the anchor end of the flexible member is attached to the frame, then the flexible member, and, therefore, the load, does not move relative to the frame, and the extent of vertical lift of the load, at the load support rail, is a function of frame tilt and the vertical lift of the frame itself. For convenience, vertical lift of the frame itself is measured at the lift pins. Appropriate mathematical analysis can be used to predict and calculate frame tilt and vertical load lift.

However, if the fixed anchor is not the frame but is, instead, a point whose position does change relative to the movement of the frame, e.g. the anchor end of the flexible member is not attached to the frame, then, upon movement of the frame, movement of the flexible member is restrained by the anchor thus causing the frame to move against the flexible member at the sheave causing relative movement between frame and flexible member. The result is that the load handling assembly, and the load, is caused to slide along the load support rail. The extent of the slide is equal to the extent of the relative movement of frame and flexible member which is the apparent difference in length of the flexible member relative to either the front side or the backside of the load support rail measured at times just prior to and just after the frame is lifted. As mentioned above, appropriate mathematical analysis can be used to predict and calculate frame lift and tilt, load slide distance and vertical load lift.

By selective placement of lift pins, guide pin and fixed anchor, as disclosed below, the vertical lift and tilt of the load can be controlled such that the ratio of the net vertical lift distance of the load to the net vertical lift distance of the frame is an amount in the range of from about less than 1 to an amount in excess of 2, and preferably an amount in the range of from about 1 to about 2. In this regard, if, in the situation wherein, the fixed anchor is not the frame and the frame, upon being lifted, exhibits substantially no tilt, then for every unit of vertical lift of the frame itself, the load will be lifted 2 units. Likewise, if, in the situation wherein, the fixed anchor is the frame and the frame, upon being lifted, exhibits substantially no tilt, then for every unit of vertical lift of the frame itself, the load will be lifted 1 unit. Frame tilt decreases vertical lift ratio in proportion to tilt.

BRIEF DESCRIPTION OF THE DRAWINGS

FIG. 1: Front (Load Side) View of Apparatus.

FIG. 2: Right Side View of FIG. 1 showing spike for carrying a round bale extending to the right from the load side of the Apparatus.

FIG. 3: Back Side (Lift Side) View of Apparatus.

FIG. 4: Right Side Section View of FIG. 3 taken along line 4—4 showing spike for carrying a round bale extending to the right from the load support rail on the load side of the Apparatus.

FIG. 5: Right Side Section View of FIG. 1 taken along line 5—5 showing spike (load carrier) for carrying a round bale extending to the right, on the load side of the Apparatus, from the load mover slidably installed in the interior of the load support rail.

FIG. 6: Right Side View of load handling assembly, as it would be positioned in FIG. 5, comprising a load mover having attached thereto a load carrier and a load attachment means.

FIG. 7: Top View of load handling assembly.

FIG. 8: Bottom View of load handling assembly.

FIG. 13: Partial schematic representation of FIG. 12 showing the positions of the principal pivot points of the combination of the 3-point connection and the Apparatus in the ending/lift position. The Figure is a graphical representation of a mathematical model employed in a method of predicting the extent of lift and tilt of the Apparatus. The Figure is a 2-dimensional presentation of the relative angular and lineal positions of the said principal pivots in the lifted condition.

FIG. 14: Schematic representation of FIG. 11 showing the positions of the principal pivot points of the combination of the 3-point connection and the Apparatus as well as the centerline of the Apparatus in the starting/rest position. The Figure is a graphical representation of a mathematical model employed in a method of predicting the extent of lift and tilt of the Apparatus. The Figure is a 2-dimensional presentation of the relative angular and lineal positions of the said principal pivots and the centerline of the Apparatus in the starting condition.

FIG. 15: Schematic representation of FIG. 12 showing the positions of the principal pivot points of the combination of the 3-point connection and the Apparatus as well as the centerline of the Apparatus in the ending/lifted position. The Figure is a graphical representation of a mathematical model employed in a method of predicting the extent of lift and tilt of the Apparatus. The Figure is a 2-dimensional presentation of the relative angular and lineal positions of the said principal pivots and the centerline of the Apparatus in the lifted condition.

FIG. 16: A partial, cut-a-way, top view of FIG. 11 taken along line 16—16 from a position on the back side of the Apparatus. The Figure shows the lift arms of the tractor connected to the lift pins of the Apparatus, and the guide arm of the tractor connected to a guide pin installed in a pivot hole of the guide pivot assembly. The Figure also shows the flexible member, a cable, passing between the guide pin and the back side of the load support rail. The Load handling assembly installed on the front side of the load support rail is not shown.

FIG. 17: A partial, cut-a-way, top view of FIG. 11 taken along line 17—17 from a position on the back side of the Apparatus. The Figure shows the lift arms of the tractor connected to the lift pins of the Apparatus, a roller installed in a roller hole of the guide pivot assembly, the cable passing between the roller and the back side of the load support rail, and the cable connected to the fixed anchor, the tractor tow bar. The load handling assembly installed on the front side of the load support rail is not shown.

FIG. 18: A partial, right side, section view of FIG. 17 taken along line 18—18 showing the cable passing between the roller and the back side of the load support rail and connected to the fixed anchor, the tractor tow bar. The load handling assembly installed on the front side of the load support rail and the lift arms are not shown.

DESCRIPTION OF THE PREFERRED EMBODIMENTS

Figure 9:
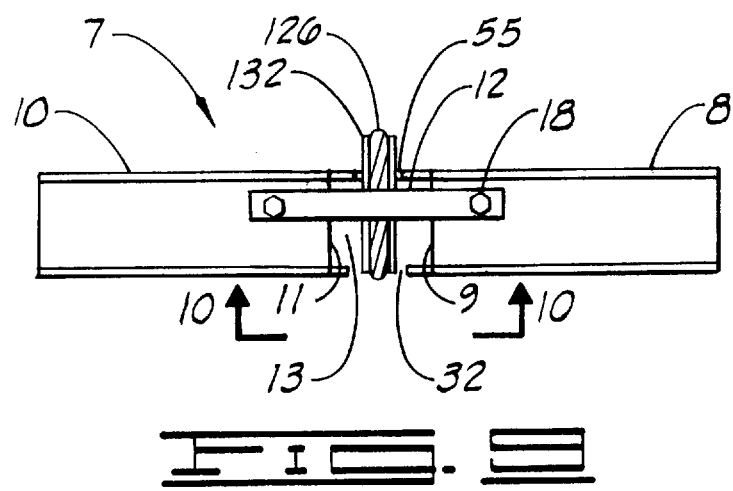
FIG. 9: Partial Top View of FIG. 1. (Looking down from Front Side.) Not shown: Load handling assembly; Lift Pins; Guide Pivot Assembly; Cable Roller.

Referring now to the drawings, and particularly to FIGS. 1–12 and 16–18 thereof, the lift apparatus of this invention, which is generally depicted by reference numeral 1, is a planar frame structure, preferably rectangular in shape, having a front side, as seen in FIG. 1, and a back side, as seen in FIG. 3. The front side is sometimes referred to as the load side and the back side is sometimes referred to as the lift side.

Frame 1 is comprised of left side rail 2, right side rail 4, bottom rail 6, and a top rail 7. Top rail 7 is divided into left hand segment 8, right hand segment 10 and strap 12. Gap 13 is formed between end 9 of segment 8 and end 11 of segment 10. Left hand segment 8, and right hand segment 10 are connected by strap 12 which spans gap 13. Side rails 2 and 4, which are preferably vertical and equal in length, are rigidly connected to bottom rail 6 and segments 8 and 10 by any suitable means, such as welding. The top and bottom rails are parallel and preferably equal in length. The side rails and top and bottom rails can be made of any suitable structural material and shape, such as steel channel members.

Figure 10:
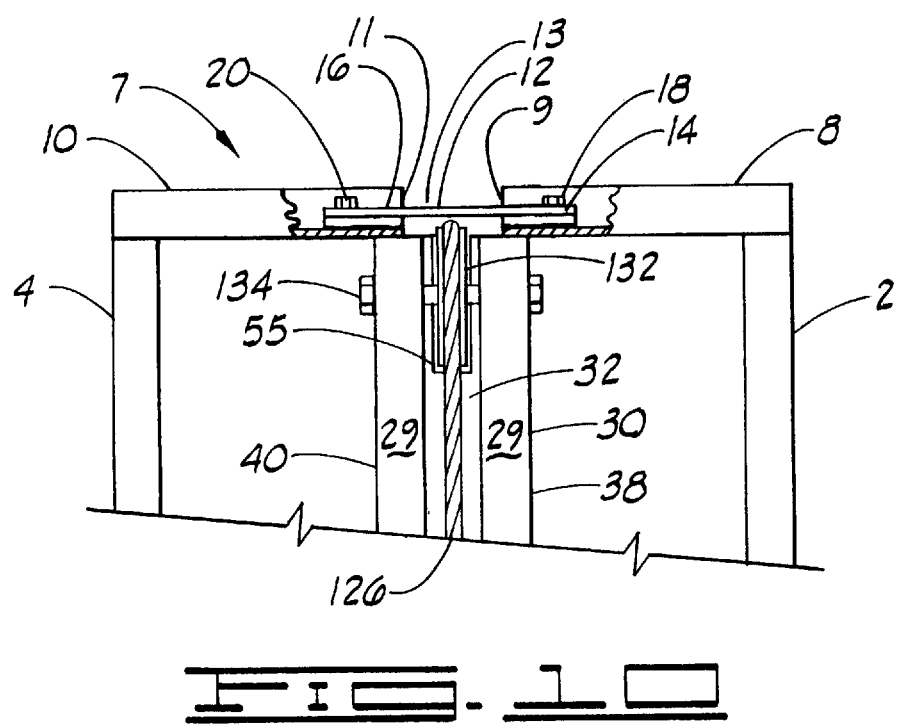
FIG. 10: Cut-a-way Partial Front View of FIG. 1. (Looking from Front Side.)

As mentioned above, left hand segment 8 and right hand segment 10 are rigidly connected together by strap 12. As seen in FIGS. 9 and 10, strap 12 is spaced above segment 8 by shim 14 and above segment 10 by shim 16. Strap 12 and shim 14 are attached to segment 8 by bolt 18, and strap 12 and shim 16 are attached to segment 10 by bolt 20. The functions of strap 12 and shims 14 and 16 will become apparent hereinbelow.

As seen in FIG. 2, holes 22, 24, 26 and 28 are drilled through the outer surface and along the centerline of right side rail 4. The holes are spaced apart and in vertical alignment. For convenience, in connection with the operation of the apparatus, the holes are numerically identified from the bottom of the side rail in an upward direction as lift pin hole #1 (hole 22), lift pin hole #2 (hole 24), lift pin hole #3 (hole 26) and lift pin hole #4 (hole 28). Notice that the holes are drilled adjacent the lower end of right side rail 4. Further note, in FIG. 11, that the uppermost hole, lift pin hole #4 (hole 28), is preferably spaced vertically below the horizontal plane containing right side fixed pivot, PL. The significance of this preferred vertical separation will become apparent in connection with the operation of the apparatus.

Lift pin, L, is removably inserted into lift pin hole #2 and preferably projects outwardly from the exterior surface of right side rail 4.

Holes 22a, 24a, 26a, and 28a, not shown, are drilled through the outer surface and along the centerline of left side rail 2 and are in horizontal alignment with holes 22, 24, 26 and 28.

Lift pin, La, is removably inserted into lift pin hole #2a and preferably projects outwardly from the exterior surface of left side rail 2.

Load support rail 30, a tubular member having hollow interior 31 and, preferably, a rectangular cross-section, as shown in FIGS. 16 and 17, is situated within the interior of frame 1 and is spaced between the equidistant from rails 2 and 4. For purposes of analysis and operational predictability, it is preferred that the vertical centerline of load support rail 30 and the vertical centerlines of rails 2 and 4 lie in the same plane. To help maintain the rigidity and separation of load support rail 30 between rails 2 and 4, tubular member 34 is rigidly connected, such as by welding, between the inside surface of rail 2 and the left exterior side surface 38 of rail 30 at a point substantially intermediate bottom rail 6 and left hand segment 8, and tubular member 36 is rigidly connected, such as by welding, between the inside surface of rail 4 and the right exterior side surface 40 of rail 30 at a point substantially intermediate bottom rail 6 and right hand segment 10.

Load support rail 30, as particularly shown in FIGS. 1, 3, 16 and 17, has a front side (load side) and back side (lift side). Accordingly, Load support rail 30 is perpendicular and rigidly attached to bottom rail 6, and perpendicular to and rigidly attached to top rail 7 at segments 8 and 10 by any suitable means, such as by welding, so that the load side of frame 1 and the load side of load support rail 30 face in the same direction.

The load side of load support rail 30 has slot 32 cut into the face 29 thereof. Slot 32 completely penetrates face 29 to enable access via slot 32 from the hollow interior 31 of rail 30 to the exterior thereof. Slot 32, which extends from bottom rail 6 to top rail 7, is positioned so that the centerline of slot 32 and the centerline of gap 13 each lie in the same plane which is perpendicular to the plane of frame 1. The width of gap 13 is equal to or greater than the width of slot 32 but less than the distance between side surface 38 and side surface 40. Accordingly, the lengths of segments 8 and 10 are adjusted so that end 9 of segment 8 and end 11 of segment 10 each rest on rail 30, as seen in FIGS. 1 and 3, so as to produce gap 13 having a width equal to or greater than the width of slot 32 but less than the distance between side surface 38 and side surface 40.

As best seen in FIGS. 9 and 10, slot 55 is cut into and completely through backside surface 48 of load support rail 30 adjacent to the upper end thereof. Slot 55 opens into gap 13 and enables access via slot 55 from the hollow interior 31 of rail 30 to the exterior thereof.

Guide pivot assembly 42, as shown in FIGS. 3, 16 and 17, is rigidly attached, such as by welding, to the opposite outside edges 44 and 46 of backside surface 48 of load support rail 30. Guide pivot assembly 42 is positioned intermediate bottom rail 6 and slot 55. Guide pivot assembly 42, which guides and stabilizes frame 1 and load during lift and transport, comprises pivot plate 50, attached to edge 46, pivot plate 52, attached to edge 44, guide pin 54 and roller pin 56.

Referring now to FIGS. 2, 4, and 18, pivot plate 50 is shown as having drilled therein pivot holes 57, 59 and 61, pivot holes 58, 60, 62 and 64 and roller holes 66, 68 and 70. Odd numbered pivot holes 57, 59 and 61 are spaced apart and in vertical alignment. Even numbered pivot holes 58, 60, 62 and 64 are spaced apart and in vertical alignment. Roller holes 66, 68 and 70 are spaced apart and in vertical alignment. Odd numbered pivot holes 57, 59 and 61 are positioned adjacent the outside edge 72 of pivot plate 50. Roller holes 66, 68 and 70 are positioned adjacent the inside edge 74 of pivot plate 50. Even numbered pivot holes 58, 60, 62 and 64 are positioned substantially intermediate the odd numbered pivot holes and the roller holes. It is preferred that the holes be in a substantially staggered pattern as shown in the drawings.

It is preferred, from a predictability aspect but not from a utility aspect, to note the distance of each pivot hole and each roller hole from the centerline of frame 1. In this regard, recall that the various lift pivot holes, previously described, are, preferably, positioned along the centerline of right side rails 2 and 4 and, thus along the centerline of frame 1.

For convenience, in connection with the operation of the apparatus, the pivot holes are numerically identified from the bottom of the pivot plate in an upward direction as pivot hole #1 (hole 58), pivot hole #2 (hole 57,), pivot hole #3 (hole 60) pivot hole #4 (Hole 59), pivot hole #5 (hole 62), pivot hole #6 (hole 61) and pivot hole #7 (hole 64). Notice, in FIG. 11, that the uppermost pivot hole, pivot hole #7 (hole 64), is preferably spaced vertically below the horizontal plane containing center pivot, Pc. The significance of this preferred vertical separation will become apparent in connection with predicting the results to be expected upon operation of the apparatus.

Figure 11:
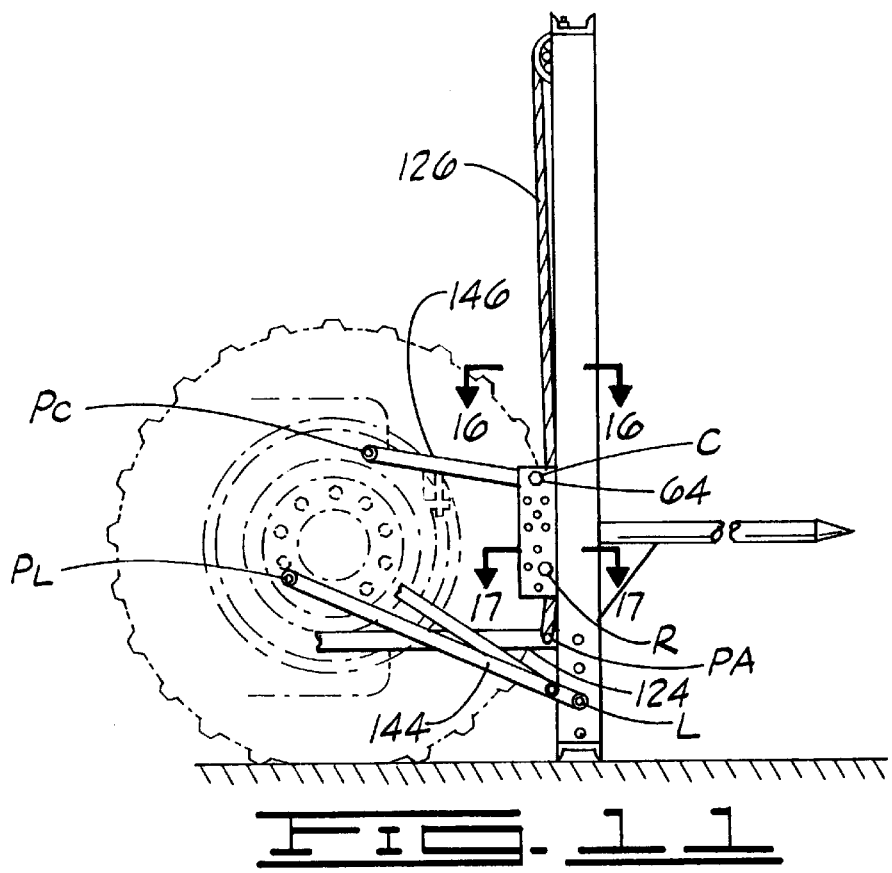
FIG. 11: Right Side View showing Apparatus of FIG. 2 attached to the three-point lift connection feature of a farm tractor in the starting/rest position.
Figure 12:
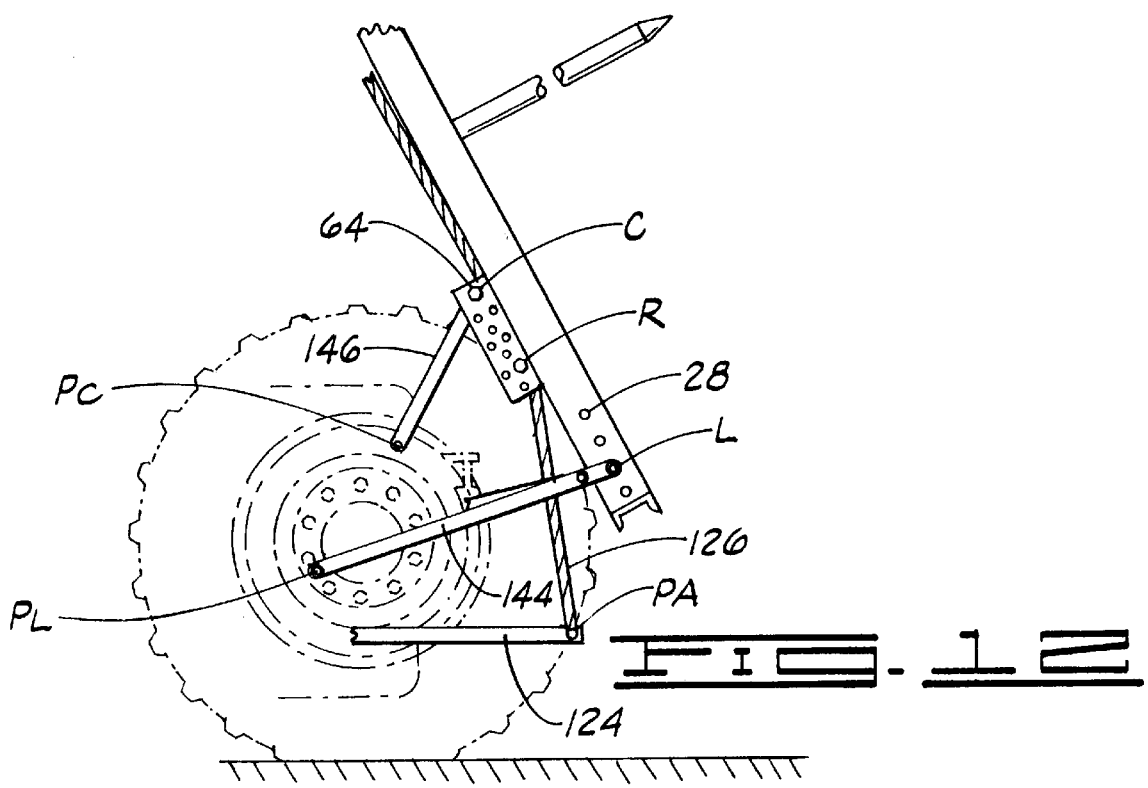
FIG. 12: Partial Right Side View showing Apparatus of FIG. 2 attached to the three-point lift connection feature of a farm tractor in the ending/lift position wherein the Apparatus is tilted in the positive direction, i.e., toward the three point connection. Not shown: Top of apparatus, pulley and connecting cable.

Guide pin 54 is shown in FIGS. 11 and 12 as being removably inserted into pivot hole #7. It is preferred, from a predictability aspect but not from a utility aspect, that the pivot hole containing the guide pin is referred to as pivot hole C. Sometimes the guide pin itself is referred to as guide pin C. Both designations refer to the same physical location.

Furthermore, the roller holes are also numerically identified from the bottom of the pivot plate in an upward direction as roller hole #1 (hole 66), roller hole #2 (hole 68), and roller hole #3 (hole 70).

Roller pin 56 is shown in FIGS. 11 and 12 as being removably inserted into roller hole #1. It is preferred, from a predictability aspect but not from a utility aspect, that the roller hole containing the roller pin be referred to as roller hole R. Sometimes the roller pin itself is referred to as roller R. Both designations refer to the same physical location.

Holes 57a, 59a, 61a, 58a, 60a, 62a, 64a, 66a, 68a and 70a, not shown, are drilled in pivot plate 52 and are in horizontal alignment with holes 57, 59, 61, 58, 60, 62, 64, 66, 68 and 70.

Guide pin, Ca, is removably inserted into pivot hole #7a and Roller, Ra, is removably inserted into roller hole #1a.

Referring more particularly now to FIGS. 1, 5, 6, 7 and 8, load handling assembly 72, comprising load mover 74 having attached thereto load carrier 76 and the load attachment means 78, is shown independently and in operating position in the hollow interior 31 of load support rail 30.

Load mover 74, having a front side and a back side, is comprised of I-beam 80, consisting of web member 82 positioned in the usual manner between flange 84 and flange 86, pipe roller 88 and pipe roller 90. As seen in FIG. 5, the front side of load mover 74 faces in the same direction as the front side of frame 1 and the front side of load support rail 30.

Pipe roller 88 is installed on the front side of I-beam 80 at the upper end thereof and rotatably mounted on axle 92 positioned between flange 84 and flange 86. Axle 92 is mounted in and supported by horizontally aligned holes in flanges 84 and 86 such that the peripheral surface of roller 88 extends beyond front edges 94 and 95 and top edge 96 of I-beam 80.

Pipe roller 90 is installed on the back side of I-beam 80 at the lower end thereof and rotatably mounted on axle 98 positioned between flange 84 and flange 86. Axle 98 is mounted in and supported by horizontally aligned holes in flanges 84 and 86 such that the peripheral surface of roller 90 extends beyond back edges 100 and 102 and bottom edge 104 of I-beam 80.

Load carrier 76 preferably consists of spike 106, having pointed distal end 108 and blunt proximal end 110, and gusset 112. Proximal end 110 is sometimes referred to as the base of the spike. Gusset 112 is perpendicular and rigidly connected to spike 106 along side 114. The proximal end 110 of spike 106 and side 116 of gusset 112 are perpendicular and rigidly connected to web 82 of I-beam 80 whereby spike 106 is perpendicular to and projects outwardly from the front side of load mover 74.

It is to be understood that the element identified as spike 106 can be any other load supporting means such as a hopper, a fork, a bucket or the like. Appropriate means of stabilizing the mentioned alternative elements against rotation around proximal end 110 is well within the ordinary skill of the art.

Load attachment means 78 consists of strap 118 having bail 120 rigidly attached to one side thereof whereby the plane of the bail is preferably parallel to the plane of web 82 as seen in FIG. 5. Strap 118 is rigidly attached to top edges 96 and 122 of I-beam 80.

As shown in FIG. 5, I-beam 80 is positioned to slide, and preferably to roll, in the hollow interior 31 of load support rail 30 whereby spike 106 projects outwardly from load support rail 30 through slot 32. It is to be understood that the horizontal distance between the peripheral surface of roller 88 and the peripheral surface of roller 90 is not greater than the transverse inside dimension of hollow interior 31. In this regard, the transverse direction is perpendicular to the plane of frame 1. It is preferred that the horizontal distance between the peripheral surface of roller 88 and the peripheral surface of roller 90 be fixed to enable rollers 88 and 90 to simultaneously contact and roll against the opposite inside surfaces of hollow interior 31 upon movement of I-beam 80 in hollow interior 31. Under this condition web 82 and the base of the spike will, therefor, lie substantially within the plane of frame 1.

The load connector assembly, which operates in cooperation with frame 1 and an anchor, such as tow bar 124, as shown in FIGS. 11, 12, 17 and 18, to move load handling assembly 72, comprises a flexible member, such as cable 126, having anchor end 128 and load end 130. Cable 126 extends from the front side of load support rail 30 to the back side of the load support rail 30 by passing over sheave 132 installed transverse to the plane of frame 1 in slot 55 formed between the front side and the back side of the upper end of load support rail 30. As previously mentioned, the transverse direction is perpendicular to the plane of frame 1.

Sheave 132 is rotatably mounted on axle 134 positioned between side surface 38 and side surface 40 of load support rail 30. Axle 134 is mounted in and supported by horizontally aligned holes in side surfaces 38 and 40 such that the peripheral surface of sheave 132 and cable 126 riding in sheave 132 extends into gap 13 under strap 12, as best seen in FIG. 10. It is, accordingly, seen that strap 12 operates as a cable guard to maintain cable 126 in sheave 132 and, because strap 12 is easily removed by disengagement of bolts 18 and 20, also operates as a means of access to hollow interior 31 to enable the placement of I-beam 80 into hollow interior 31 and the installation of sheave 132 in slot 55.

In the preferred embodiment, load end 130 of cable 126 is a loop which is formed by passing the end of cable 126 through bail 120 on I-beam 80. The cable end is then fastened against the standing portion of cable 126 above the bail 120 by known means, such as cable clamps 136 and 138.

As best seen in FIGS. 3, 4, 5, 16 and 17, cable 126 travels within hollow interior 31, on the load side of load support rail 30, from bail 120 to sheave 132, travels over sheave 132, to thereby pass from the load side to the lift side of load support rail 30, and then travels adjacent to surface 48 on the lift side of load support rail 30 between guide pin C and roller R. As described below, anchor end 128 is then fastened to an appropriate cable anchor which can be separate from or a part of the lifting apparatus itself.

In the preferred embodiment, anchor end 128 of cable 126 is a loop which is formed by passing the end of cable 126 through a bail, hook or a hole in an appropriate cable anchor, such as shown on tow bar 124 in FIG. 18. The cable end is then fastened against the standing portion of cable 126 above the bail, hook or hole by known means, such as cable clamps 140 and 142. For purposes of predicting the results of operations, but not for utility, the point of attachment of anchor end 128 to the cable anchor is identified as point PA.

OPERATION OF THE INVENTION

In operation, the lifting apparatus of this invention is connected to a 3-point lifting apparatus, such as that provided on a farm tractor. Schematic drawings depicting the lifting apparatus of this invention connected to a farm tractor are provided in FIGS. 11 and 12. FIG. 11 shows the apparatus in the preferred beginning/rest position and FIG. 12 shows the apparatus in the ending/lifted condition. FIG. 14, a model used for predicting operational results, corresponds to FIG. 11 and FIG. 15, a model used for predicting operational results, corresponds to FIG. 12. FIG. 13 is a partial computation model limited to the positions of lift pin L and guide pin C in the lifted condition and, thus, is related to FIG. 15.

The proximal end of lift arm 144 is rotatably connected to lift pivot PL and the distal end of lift arm 144 is rotatably connected to lift pin L on the right side of the apparatus. FIG. 11 indicates the connection in a right side view. The proximal end of lift arm 144a is rotatably connected to lift pivot PLa and the distal end of lift arm 144a is rotatably connected to lift pin La on the left side of the apparatus. The lengths of lift arms 144 and 144a are substantially identical and each is measured as the straight line distance, AL, between lift pivot PL and lift pin L. Lift pivot PL is a fixed pivot and thus remains stationary during lift and lift pin L is a moving pivot and thus does not remain stationary during lift. For purposes of predicting the results of operations, but not for utility, the distance, Pw, between lift pivots PL and PLa, and the distance, AW, between lift pins L and La, should be noted to aid in the calculation of lift arm radius, r1, the effective radial distance from lift pivot, PL, to the center line of frame 1 at lift pin, L. In this regard note FIG. 14. Accordingly, r1 is one leg of a right triangle and can be calculated by the Pythagorean theorem:

$$r1=(AL^2-l^2)^{0.5}$$

wherein, $$l=(AW=PW)/2$$

It is seen from the equation and FIG. 16, that the effective radial distance, r1, appears to be fixed for a frame of constant width and a 3-point lifting apparatus having a fixed distance between lift pivots and lift arms of constant length. However, in one embodiment, r1 can be varied without changing frame width, lift arm length or lift pivot separation, by placing connection L, the lift pin, between the respective side rails 2 and 4 and the adjacent faces 38 and 40 of load support rail 30 to thereby reduce the length of leg, l, in the above equation. Accordingly, the maximum length of r1 is length AL.

The proximal end of center/guide arm 146 is rotatably connected to center pivot Pc and the distal end of center/guide arm 146 is rotatably connected to guide pin C on the lift side of the apparatus. Center/guide arm 146 is modeled in FIGS. 13, 14, and 15 as center arm radius r2. Center pivot Pc is a fixed pivot and thus remains stationary during lift and guide pin C is a moving pivot and thus does not remain stationary during lift. FIG. 11 indicates the connection in a right side view. For purposes of predicting the results of operations, but not for utility, the distance, f2, between lift pivot PL and center pivot Pc, should be noted to aid in the calculation of P2, the perpendicular distance from center pivot, Pc, to the plane of the center line of frame 1. In this regard note FIG. 14.

It is preferred that the length of center/guide arm 146 be adjustable, accordingly, center/guide arm 146 can be a turnbuckle whose length can be changed by rotating the turnbuckle in the manner well known in the art. For purposes of predicting the results of operations, but not for utility, the length of center/guide arm 146 is adjusted until the plane passing through the centerline of the apparatus, e.g. the centerline of right side rail 4, is perpendicular to the ground.

At this point in the preferred method of operating, the position of the apparatus is shown in FIG. 11 and is modeled in FIG. 14. Accordingly, P1, the perpendicular distance from lift pivot, PL, to the plane of the centerline of frame 1, and P2, the perpendicular distance from center pivot, Pc, to the plane of the centerline of frame 1 can be calculated wherein:

$$P1=(r1^2-b^2)^{0.5}$$

and, $$P2 = P1 - f2$$

In the equation for P1, note that n=n−h1, wherein n is the perpendicular distance from the ground to lift pivot, PL, and h1 is the perpendicular distance from the ground to lift pin, L.

With further regard to the apparatus as shown in FIG. 11 and 14, and also as shown in FIGS. 12, 13 and 15, note that the distance between lift pin L and guide pin C remains fixed throughout an entire lift operation because of the fact that lift pin L and guide pin C are each a fixed point on the lift apparatus. The fixed distance between C and L is employed in a method of predicting the operation of the lift apparatus and is defined as lift pin link, r3, the radial distance from the centerline of frame 1 at lift pin, L, to the guide pin at pivot hole, C. Notice the variation in location of either lift pin L or guide pin C will alter r3; that variation in location of lift pin L will also vary the distances P1 and P2, above defined; and that variation in location of guide pin C will also vary center arm radius r2, above defined.

With still further regard to the apparatus as shown in FIGS. 11 and 14 note: primary lift angle θ (theta), the positive angle between lift arm radius, r1, and the horizontal line from lift pivot, PL, to the centerline of frame 1; and primary guide angle, φ (phi), the positive angle between center arm radius, r2, and horizontal line from center arm pivot, Pc, to the centerline of frame 1. The primary lift angle, for purposes of this disclosure, is positive when the angle is measured clockwise from the mentioned horizontal line to lift arm radius, r1. The primary guide angle, for purposes of this disclosure, is positive when the angle is measured clockwise from the mentioned horizontal lime to center arm radius, r2. Note that varying the position of lift pin L varies primary lift angle, θ (theta), and varying the position of guide pin C varies primary guide angle, φ (phi).

Still further with regard to the apparatus as shown in FIGS. 11 and 14 note that cable anchor, PA, is preferably positioned directly beneath roller, R, and that the cable anchor is not connected to the apparatus and thus remains stationary during lifting. In one embodiment, point PA can be a part of the frame, not shown, and thus not remain stationary during lifting.

In still another embodiment, the cable 126 can be directed to travel around a stationary pulley, not shown, which does remain stationary during lift and then the end of cable 126 can be connected to point PA which can be a part of the frame. The reason for the alternative cable end connections is to produce, prevent or enhance cable movement during lift. As previously stated, spike movement relative to frame 1 depends on cable movement relative to frame 1.

Finally, note, in FIGS. 11 and 14, the distance, W1, between roller R and cable anchor PA prior to lift, and compare that, in FIGS. 12 and 15, with the distance, W2, between roller R and cable anchor PA after lift. The cable movement caused by lifting frame 1 is the difference, Wo, between W2 and W1. It is, therefore, seen that the location of cable anchor PA and whether it is caused to remain or not remain stationary during lift is a very important feature of this invention.

At this point, the base of spike 106 is positioned at any desired distance m from the ground along load support rail 30 to position S1, as shown in FIG. 14, by causing cable 126 to travel over sheave 132 thereby causing load handling assembly 72 to roll in hollow interior 31 until proximal end 110 of spike 106 is positioned at position S1. Anchor end 128 is then fastened to cable anchor PA.

Lift arms 144 and 144a are then raised by any suitable means, such a hydraulic ram associated with the 3-point lifting apparatus, thereby causing lift pins L and La to rotate at lift arm radius r1 about lift pivots PL and PLa. The rotation of lift pins L and La causes guide pin C, under the influence of lift pin link r3, to rotate at center arm radius r2 about center arm pivot Pc. The rotation of lift pins L and La is continued until Lift pin L, as shown in FIG. 13, attains any desired distance h2 above ground. For purposes of predicting the results of operations, but not for utility, distance h2 is equal to or greater than distance n, the perpendicular distance from the ground to lift pivot, PL, and equal to or less than distance k, the perpendicular distance from ground to center pivot, Pc. When lift pin L attains distance h2, then the lift apparatus will be in a position as shown in FIGS. 12 and as modeled in FIGS. 13 and 15.

Referring to FIG. 13, note: secondary lift and angle ρ (rho), the positive angle between lift arm radius r1 and the horizontal line from lift pivot PL, to the perpendicular line which passes through lift pin L to ground; and secondary guide angle ω (omega), the positive angle between center arm radius r2, and the horizontal line from center arm pivot, Pc, to the perpendicular line which passes through lift pin, L, to ground. The secondary lift angle, for purposes of this disclosure, is positive when the angle is measured counter clockwise from the mentioned horizontal line to lift arm radius r1. The secondary guide angle, for purposes of this disclosure, is positive when the angle is measured counter clockwise from the mentioned horizontal line to center arm radius r2.

Also note in FIG. 13, guide pin angle μ (mu), the positive angle between lift pin link r3 and the perpendicular line passing through pivot hole, C, to ground. With pivot hole, C, as the center, the guide pin angle, for purposes of this disclosure, is positive when the angle is measured counter clockwise from the mentioned perpendicular line to lift pin link r3.

Also note, by comparing FIG. 13 and FIG. 14, that pivot pin C moved horizontally to the left, as a result of the rotation of lift pin L, by a positive distance equal to the difference between the distance e2 and the distance d1. In the absence of such movement, guide pin angle μ (mu) would be equal to lift pin angle τ (tau), the angle, with lift pin L as the center, between the centerline of frame 1 and lift pin link r3. Obviously, if distance e2 and distance d1 are equal then guide pin C moves solely vertically with no horizontal component, while if e2 is greater than d1, then a left, positive, horizontal component is introduced and if e2 is less than d1, then a right, negative, horizontal component is introduced.

From all of the above, assuming constant r1 and h2, it is evident that the values of the various angles mentioned above, i.e., the primary and secondary lift angles, the primary and secondary guide angles, the guide pin angle and the lift pin angle and distances e2 and d1, all depend upon the location of lift pin L and guide pin C and, thus, whether guide pin C rises vertically with no or some positive or negative horizontal component. In this regard, it has been discovered that the ratio of the product of the tangent of the primary lift angle and the tangent of the secondary guide angle to the product of the tangent of the secondary lift angle and the tangent of the primary guide angle is a reliable predictor of the horizontal movement of guide pin C. For purposes of this disclosure, this ratio is called the Tangent Angle Ratio, T, accordingly:

$$T = (\tan\theta \tan\omega)/(\tan\phi \tan\tau)$$

If T is 1, then guide pin C exhibits no final horizontal component of movement and the net movement of guide pin C, when lift pin L has been lifted distance h2, is vertical with respect to ground inspite of the fact that guide pin C rotates about center arm pivot Pc as lift pin L is lifted. If T is less than 1, then guide pin C exhibits final negative (right) horizontal movement. If T is greater than 1, then guide pin C exhibits final positive (left) horizontal movement. The initial positioning of guide pin C and lift pin L in the various guide pin holes and lift pin holes previously described can then be adjusted to obtain the tangent values and/or products involved in the calculation of Tangent Angle Ratio, T.

Frame 1, as seen in FIG. 12, being fixed in relation to guide pin C by way of pivot plate 50, experiences angular movement identical to that experienced by guide pin C. Thus, as seen in FIG. 15, frame tilt angle Δ (delta), the angle between the centerline of frame 1 and the perpendicular line which passes through lift pin, L, to ground, varies directly with guide pin angle $\mu$ (mu) in accordance with the relationship:

$$\Delta = \mu - \tau$$

For purpose of this disclosure with lift pin L, as center, the frame tilt angle is positive if measured counter clockwise from the mentioned perpendicular line to the centerline of frame 1 and negative if measured clockwise from the mentioned perpendicular line to the frame center line. In view of the above it is plain that the comments concerning Tangent Angle Ratio, T apply with equal facility to the vertical movements of frame 1 and guide pin C.

Returning now to the rotation of lift pin L and the resulting movement of frame 1, cable 126 and frame 1 do experience movement relative each to the other in the situation wherein cable anchor PA is fixed (is not connected to frame 1). Actually cable 126, being restrained by cable anchor PA, does not move but frame 1 does move, thus sheave 132 presses against cable 126 causing parts of cable 126 to transfer from the load side to the lift side of frame 1 to thereby cause load handling assembly 72 to slide/roll in hollow interior 31 of load support rail 30 toward sheave 132 to position S3. The extent of slide is a function of the frame tilt angle and the actual vertical lift, h2, of frame 1 and is manifested, as previously stated, by the difference Wo between the cable distance W2 after lift and cable distance W1 before lift.

Cable 126 and frame 1 do not experience movement relative each to the other in the situation wherein cable anchor PA is not fixed (is connected to frame 1). Since cable anchor PA does move along with frame 1, sheave 132, which presses against cable 126, does not cause any part of cable 126 to transfer from the load side to the lift side of frame 1. Accordingly, load handling assembly 72 does not slide/roll in hollow interior 31 of load support rail 30 toward sheave 132 to a new position relative to frame 1. However, the base of spike 106, which does not move relative to frame 1, does change relative to ground to position S2. Actually position S2 and position S1 are each the distance m from the base, O, of frame 1. The extent of vertical movement from position S1 to position S2 is a function of the frame tilt angle and the actual vertical lift, h2, of frame 1.

With regard to position S3 and position S2 the extent of slide of load handling assembly 72, where PA is fixed, is the difference Wo between the cable distance W2 after lift and cable distance W1 before lift. Accordingly, in a method of predicting position S3, position S2 is predicted by assuming that PA is not fixed, followed by applying an estimated or measured slide distance Wo to the result as modified by frame tilt to determine incremental vertical movement SL to achieve the position S3.

In addition to the operational aspects of the invention which are disclosed above, the operation of the invention is still further clarified in connection with specific illustrative Examples, the descriptions of which are set out below.

The Examples include a specific description of a test apparatus which was actually used in field tests to lift and transport round bales of hay.

The Examples also include the results of tests involving the actual operation of the described test apparatus to illustrate that frame lift and tilt and load lift can be controlled by specific mechanical connecting schemes.

The Examples also include the results obtained by the use of a calculation program useful to predict frame lift and tilt and load lift. A comparison of actual operational results with results predicted for the specific mechanical connecting schemes employed in the actual operation is provided.

Specific reference should be to FIGS. 11, 12, 13, 14 and 15 and to the contents of Table I, Definitions, and Tables III and IV, Calculation Program, in order to achieve a more complete understanding of the Examples and the invention.

TABLE I

Definitions

The definitions provided below define some, but not all, of the reference numerals and letters shown in FIGS. 11, 12, 13, 14, and 15. The reference numerals and letters not specifically defined in this Table I derive their meanings from the calculation programs contained in Tables III and IV, below. Some definitions provided below are not of actual physical structures, but instead define projections of physical structures, distances and/or quantities used in the calculation model; these projections are not parallel to the plane of the paper and are either behind, extend through or are in front of the plane of the drawings shown in FIGS. 13, 14, and 15. To be more specific, the measurements of the defined radial lengths are not to be construed as the actual measurements of a given physical structure or quantity.

The defined measurements are to be used for purposes of the calculation programs referred to above. For purposes of definition, the plane of the drawings of FIGS. 13, 14, and 15 passes through the center line of the load support rail and the center line of the load rail is perpendicular to the ground prior to lift.

| BEFORE AND AFTER LIFT | |
|---|---|
| r1 | Lift arm radius: The radial distance from lift pivot, PL, to frame center line at lift pin, L. |
| r2 | Center arm radius: The radial distance from center pivot, Pc, to guide pin at pivot hole, C. |
| r3 | Lift pin link: The radial distance from frame center line at lift pin, L, to guide pin at pivot hole, C. |
| r4 | Roller radius: The radial distance from roller, R, to lift pin, L. |
| d1 | perpendicular distance from frame center line to guide pin at pivot hole, C. |
| f2 | horizontal distance from lift pivot, PL, to center pivot, Pc. |
| n | perpendicular distance from ground to lift pivot, PL. |
| k | perpendicular distance from ground to center pivot, Pc. |
| P4 | perpendicular distance from ground to cable anchor, PA. |
| H | perpendicular distance from frame center line to outside edge, of pivot plate. |
| τ | (tau) Lift pin angle: With lift pin, L, as the center, the angle in degrees between frame center line and lift pin link, r3. |

-continued

| | |
|---|---|
| α | (alpha) Roller angle: With lift pin, L, as the center, the angle in degrees between frame center line and roller radius, r4. |
| P3 | perpendicular distance from roller, R, to frame center line. |

BEFORE LIFT

| | |
|---|---|
| P1 | perpendicular distance from lift pivot, PL, to plane of frame center line. |
| P2 | perpendicular distance from center pivot, Pc, to plane of frame center line. |
| P3 | perpendicular distance from cable anchor, PA, and roller, R, to frame center line. |
| P5 | perpendicular distance from ground to roller, R. |
| h1 | perpendicular distance from ground to lift pin, L. |
| j1 | perpendicular distance from ground to pivot hole, C; also, perpendicular distance from ground to projection, D, of pivot hole, C, on frame center line. |
| m | perpendicular distance from ground to base of spike, S1; also distance from bottom surface of frame at O to base of spike, S1, along frame center line. |
| W1 | distance from roller, R, to cable anchor, PA. |
| G | perpendicular distance from ground to bottom edge, of pivot plate. |
| E | perpendicular distance from ground to top edge, of pivot plate. |
| θ | (theta) Primary lift angle: With lift pivot, PL, as the center, the positive angle in degrees between lift arm radius, r1, and the horizontal line from lift pivot, PL, to frame center line. The primary lift angle, for purposes of this disclosure, is positive when the angle is measured clockwise from the inentioned horizontal line to lift arm radius, r1. |
| Φ | (phi) Primary guide angle: With center pivot, Pc, as the center, the positive angle in degrees between center arm radius r2, and horizontal line from center arm pivot, Pc, to frame center line. The primary guide angle, for purposes of this disclosure, is positive when the angle is measured clockwise from the mentioned horizontal line to center arm radius, r2. |

AFTER LIFT

| | |
|---|---|
| rc | Center arm critical radius: The horizontal distance between lift pin, L, and the perpendicular line which passes through center arm pivot, Pc, to ground. |
| rb | Slant radius: The slant. distance from lift pin, L, to center arm pivot, Pc. |
| Γ | (gamma) Slant radius angle: With lift pin, L, as the center, the angle in degrees between center arm critical radius, rc, and slant radius, rb. |
| μ | (mu) Guide pin angle: The positive angle in degrees between lift pin link, r3, and the perpendicular line passing through pivot hole, C, to ground; also, the angle in degrees between lift pin link, r3, and the perpendicular line which passes through lift pin, L, to ground. With pivot hole, C, as the center, the guide pin angle, for purposes of this disclosure, is positive when the angle is measured counter clockwise from the mentioned perpendicular line to lift pin link, r3. |
| ρ | (rho) Secondary lift angle: With lift pivot, PL, as the center, the positive angle in degrees between lift arm radius, r1, and the horizontal line from lift pivot, PL, to the perpendicular line which passes through lift pin, L, to ground. The secondary lift angle, for purposes of this disclosure, is positive when the angle is measured counter clockwise from the mentioned horizontal line to lift arm radius, r1. |
| ω | (omega) Secondary guide angle: With center pivot, Pc, as the center, the positive angle in degrees between center arm radius r2, and the horizontal line from center arm pivot, Pc, to perpendicular line which passes through lift pin, L, to ground. The secondary guide angle, for purposes of this disclosure, is positive when the angle is measured counter clockwise. from the mentioned horizontal line to center arm radius, r2. |
| Δ | (delta) Frame tilt angle: the angle in degrees between the frame center line and the perpendicular line which passes through lift pin, L, to ground. With lift pin, L, as center, the angle, for purposes of this |

| | |
|---|---|
| | disclosure, is positive if measured counter clockwise from the mentioned perpendicular line to the frame center line and negative if measured clockwise from the mentioned perpendicular line to the frame center line. |
| β | (beta) Cable angle: With lift pin, L, as center the angle in degrees between roller radius, r4, and the horizontal line passing through lift pin, L. |
| h2 | perpendicular distance from ground to lift pin, L. |
| h3 | perpendicular distance from ground to base, O, of frame. |
| j2 | perpendicular distance from ground to pivot hole, C. |
| Z | perpendicular distance from ground to projection, D, of pivot hole, C, on frame center line. |
| S | perpendicular distance from ground to base of spike, S3, at frame center line. |
| W2 | distance from roller, R, to cable anchor, PA. |

EXAMPLES

A lift apparatus was constructed in accordance with the disclosure of this invention. The apparatus was a 26-inch wide by 78-inch tall rigid, rectangular frame consisting of 4-inch steel channel members. A 4-inch square, hollow steel tube was placed midway between the 78-inch side rails with the upper and lower ends thereof being rigidly connected to the top and bottom rails. The 4-inch tube was braced at the midpoint thereof by attaching 2-inch square steel tubing parallel to the top and bottom rails and between each vertical side of the 4-inch tube and the steel channel side rails.

Each side rail of the frame contained 4 lift pin holes drilled one above the other along the longitudinal axis thereof. The holes in one rail were in horizontal alignment with the holes in the other rail. The holes were used to removably insert lift pins into each in a manner perpendicular to and extending outwardly from the outside surface of each rail.

The 4 holes were numbered in ascending order from bottom to top. The distances of holes 1–4 above ground, i.e., the bottom surface of the bottom rail of the frame were 4.625, 7.75, 9.25 and 11.375 inches, respectively.

A 1⅞-inch wide slit was cut in the front side (load side) of the 4-inch square tubing. The slit extended the full length of the tubing from the top to the bottom thereof. A second slit was cut in the back side (lift side) of the square tubing and extended from the upper end thereof by an amount just sufficient to enable the installation of a 3-inch diameter sheave in the slit in a position transverse (perpendicular) to the plane of the frame. The pulley was installed on an axis connected to the vertical sides of the tube in a manner to permit a cable passing over the sheave to travel within the hollow interior of the tubing and adjacent to the back side of the tube. A steel strap was bolted over the pulley to retain a ⅜-inch cable in the sheave groove.

Two rectangular, flat steel plates were welded in parallel to the back side (lift side) of the 4-inch tube at the opposite edges thereof. Each plate was about 15.06 inches long and about 3.75 inches wide, wherein the long edge of each was the side welded to the tube. Each plate contained 7 pivot holes drilled therein for the removable attachment thereto of a guide pin and at least one hole for the removable attachment thereto of a cable roller. The plates were attached to the tubing so that the pivot holes and roller holes were in horizontal alignment. The top edge of each plate was about 32.94 inches above ground, i.e., the bottom surface of the bottom rail of the frame.

The 7 pivot holes were numbered in ascending order from bottom to top with the center of the four odd numbered holes being drilled 4 inches from the centerline of the tube and the three even numbered holes being drilled 4.5 inches from the centerline of the tube. The distances of holes 1–7 above ground, i.e., the bottom surface of the bottom rail of the frame, were 19.00, 21.25, 23.00, 25.00, 27.00, 28.75 and 31.38 inches respectively. The cable roller hole was drilled 3 inches from the centerline of the tube and 21.00 inches above ground, i.e., the bottom surface of the bottom rail of the frame.

An 18-inch long piece of "I" beam, sufficiently small to enable it to be slidably placed in the hollow interior of the 4-inch square tubing, was fitted with two pipe rollers made from ½-inch pipe. One roller was placed at the top/front of the beam and the second was placed at the bottom/back of the beam. The proximal end of a spike, 48 inches in length and 1⅞ inches in diameter, was welded to the midpoint of the front side (load side) of the I beam and gusseted from the bottom of the spike to the I beam. A bail was welded to the top of the I beam for cable attachment. The distal end of the spike was sharpened to a point. Upon placement of the I beam into the interior of the tubing, the 48-inch spike welded thereto extended from the slit cut in the front of the 4-inch tube.

A ⅜-inch cable of sufficient length to travel from the bail welded to the top of the I beam, up and over the top of the sheave and down the backside of the 4-inch tube to an anchor was provided. A cable equal in length to twice the height of the frame was of sufficient length to permit the spike to be fully lowered to the bottom rail on the front side (load side) of the frame and to be fastened to an anchor at the level of the bottom rail on the back side (lift side) of the frame.

The lift apparatus described above was used in experiments in conjunction with a farm tractor having a 3-point hydraulic lift feature on the rear of the tractor. The 3-point lift included two lift pivots, PL, situated equidistant from the longitudinal axis of the tractor, one center pivot, Pc, situated on the longitudinal axis of the tractor, two lift arms and one length-adjustable guide arm, which is sometimes referred to as a center link. The lift pivots were in alignment, spaced 19.25 inches apart horizontally and 20.50 inches (distance n) vertically above the ground level. The center pivot was spaced 34.00 inches (distance k) vertically above ground level and 8.5 inches (distance f2) horizontally from the lift pivots. It is, thus, apparent that there was a 13.5-inch (k−n) vertical separation between the plane of the lift pivots and the plane of the center pivot. Each lift arm was 34.25 inches long, wherein the length of each lift arm was the straight line distance from the lift pivot connection (proximal end) to the lift pin connection (distal end). The back tires of the tractor were spaced apart 60.00 inches.

The experiments described herein were performed with the tractor and lift apparatus being placed on substantially level ground.

Lift pins were placed in aligned lift holes on the side rails of the lift apparatus at a desired distance (h1) above the ground and the distal ends of the lift arms were removably connected to the lift pins.

Based on the apparatus width (26"), the lift pivot separation (19.25") and the lift arm length (34.25"), the lift arm radius, r1, was calculated to be about 34.08 inches. Furthermore, it is obvious that the separation between each lift arm and its adjacent tractor back tire was about 17 inches.

The guide pin was removably attached to any aligned pivot hole pair, the center link, r2, was connected to the guide pin and then the length of the center link was adjusted until the frame was perpendicular to the ground.

The ⅜-inch cable was attached to the bail on the I beam, passed up and over the outside surface of the pulley, down behind the guide pin and cable roller and attached to an anchor to thereby establish a desired total length of cable. In this regard, the length of the cable extending from the anchor, to the pulley and to the bail was adjusted at the anchor end thereof until the spike attached to the I-beam was placed at position S1, which is a desired distance, m, above the ground, to thereby establish the desired total length of cable. The anchor, in all of the Examples described below, was a solid bar rigidly connected to the tractor and extending outwardly therefrom to a point substantially vertically beneath the roller, R. This bar is commonly referred to as a tow bar.

At this point, the perpendicular distance, P1, from each lift pivot, PL, to the plane of the frame center line was calculated using the previously calculated lift arm radius, r1, and the distance, b (b=n−h1), from lift pin, L, to the intersection of the said perpendicular distance, P1, with the frame center line. Similarly, the perpendicular distance, P2, from the center pivot, Pc, to the plane of frame center line was calculated using the calculated distance P1 and the previously mentioned distance, f2, (P2=P1−f2).

Refer to FIG. 11 to view an illustration of the physical arrangement of tractor and lift frame apparatus prior to lift. Also refer to FIG. 14 to view an illustration of the position of the model used to predict the operation of tractor and apparatus at a time prior to lift.

When the hydraulic lift of the tractor, which was attached to each lift arm, was actuated, the frame, rising by impulse of the hydraulic lift against the anchored cable, caused the spike, and any load thereon, to be vertically lifted from the ground by an amount of up to about two times the vertical lift of the frame from the ground. At the termination of the lift, the frame had been lifted and tilted and the load had been lifted to position S3. It is noted that the spike would have been lifted to position S2 if the anchor end of the cable had been connected to the frame.

Refer to FIG. 12 to view an illustration of the physical arrangement of tractor and lift apparatus subsequent to lift. Also refer to FIGS. 13 and 15 to view illustrations of the position of the model used to predict the operation of tractor and apparatus at a time subsequent to lift. FIGS. 12, 13 and 15 show the frame being tilted in the positive (+) direction. That is, the Figures show the top of the frame tilting toward the fixed pivots PL, and Pc on the tractor.

EXAMPLE I

The lift apparatus described above was used in conjunction with the farm tractor described above to determine the utility of the apparatus to lift and transport round bales of hay. The round bales had a width of about 4 feet and a heighth of about 5 feet. Each had a weight in the range of from about 800 to about 1000 pounds. The apparatus and tractor combination performed the required lift and transportation without difficulty.

EXAMPLE II

The combination tractor and lift apparatus described above was operated to demonstrate the variation in frame tilt and load lift achieved by changing the location of the guide pin from one pivot hole to another while maintaining the lift pin in the same lift pin hole. In this regard all lifts were performed with the distal end of the lift arm connected to lift pins inserted into lift pin hole number two located 7.75 inches above the ground. Furthermore, the length of cable was adjusted at the anchor end whereby the initial position, S1, of the spike was established at a distance of 25 inches above the ground, i.e., m=25". Still further, the tractor hydraulics were permitted to operate to the maximum of their range of motion, whereby the distal ends of the lift arms at lift pin, L, at the termination of lift were 33 inches above the ground, i.e., h2=33".

The results are provided in Table II-A and Table II-B, below, wherein all data provided were acquired by actual field measurements. Refer to Table I and FIGS. 13, 14 and 15 for definitions of the quantities referred to in Table II-A and Table II-B.

It will be seen that the greatest load lift, distance S, was achieved with the guide pin in pivot hole two, wherein the ratio of load lift, measured to the base of the terminal spike position S3, to frame lift, measured to the lift pin, was equal to about 1.94. The lift ratio was calculated by the equation.

$$(S-m)/(h2-h1).$$

The least load lift was achieved with the guide pin in pivot hole seven, wherein the lift ratio was equal to about 1.62.

The steady decline in observed load lift from hole two to hole seven was due to increasing positive tilt of the frame, and the decrease in observed load lift from hole two to hole one was due to increasing negative tilt of the frame. Frame tilt was directly caused by the different position of the guide pin for each lift.

With regard to frame tilt, note that the distance, W2, from the roller to the cable anchor decreased with increase in positive frame tilt and increased with increase in negative frame tilt. The spike moves relative to the frame only upon movement of the cable relative to the frame. Cable relative movement, Wo, is the difference between cable distance, W1, before lift and cable distance, W2, after lift. This Example, accordingly, demonstrates that load lift is a function of frame lift, frame tilt and cable movement.

Furthermore, the Example also indicates that cable movement relative to the frame occurs only if the cable anchor is not rigidly connected to the frame. Accordingly, if the cable anchor is rigidly connected to the frame, then, due to absence of cable movement, spike lift is solely determined by frame lift and frame tilt. The terminal position, S2, of the spike is thus established by the set distance, m, of the spike along the frame from base, O, as affected by frame lift and tilt.

It is believed that frame tilt, frame lift and cable movement, and, thus, load lift, for the results shown in Table II, can be accurately estimated by use of the program set out in Table III, below.

TABLE II-A

TEST MEASUREMENTS BALE LIFT APPARATUS
LIFT HOLE #2

| | \multicolumn{7}{c}{PIVOT HOLE POSITION} | | | | | | |
|---|---|---|---|---|---|---|---|
| | 1 | 2 | 3 | 4 | 5 | 6 | 7 |

VERTICAL MEASUREMENTS, inches
BEFORE AND AFTER LIFT

| | 1 | 2 | 3 | 4 | 5 | 6 | 7 |
|---|---|---|---|---|---|---|---|
| n | 20.50 | 20.50 | 20.50 | 20.50 | 20.50 | 20.50 | 20.50 |
| k | 34.00 | 34.00 | 34.00 | 34.00 | 34.00 | 34.00 | 34.00 |
| P4 | 13.50 | 13.50 | 13.50 | 13.50 | 13.50 | 13.50 | 13.50 |

BEFORE LIFT

| | 1 | 2 | 3 | 4 | 5 | 6 | 7 |
|---|---|---|---|---|---|---|---|
| h1 | 7.75 | 7.75 | 7.75 | 7.75 | 7.75 | 7.75 | 7.75 |
| G | 17.88 | 17.88 | 17.88 | 17.88 | 17.88 | 17.88 | 17.88 |
| j1 | 19.00 | 21.25 | 23.00 | 25.00 | 27.00 | 28.75 | 31.38 |
| E | 32.94 | 32.94 | 32.94 | 32.94 | 32.94 | 32.94 | 32.94 |
| m | 25.00 | 25.00 | 25.00 | 25.00 | 25.00 | 25.00 | 25.00 |
| P5 | 21.00 | 21.00 | 21.00 | 21.00 | 21.00 | 21.00 | 21.00 |

AFTER LIFT

| | 1 | 2 | 3 | 4 | 5 | 6 | 7 |
|---|---|---|---|---|---|---|---|
| h2 | 33.00 | 33.00 | 33.00 | 33.00 | 33.00 | 33.00 | 33.00 |
| h3 | 25.50 | 25.00 | 25.25 | 25.25 | 25.75 | 25.75 | 25.75 |
| j2 | 44.88 | 46.38 | 47.00 | 48.25 | 48.75 | 49.63 | 50.50 |
| Z | 43.75 | 46.00 | 47.88 | 49.88 | 50.50 | 51.88 | 53.13 |
| S | 72.88 | 73.88 | 72.25 | 71.00 | 68.75 | 67.88 | 66.00 |

HORIZONTAL MEASUREMENTS, inches
BEFORE AND AFTER LIFT

| | 1 | 2 | 3 | 4 | 5 | 6 | 7 |
|---|---|---|---|---|---|---|---|
| f2 | 8.5 | 8.5 | 8.5 | 8.5 | 8.5 | 8.5 | 8.5 |
| H | 5.75 | 5.75 | 5.75 | 5.75 | 5.75 | 5.75 | 5.75 |
| d1 | 4.00 | 4.50 | 4.00 | 4.50 | 4.00 | 4.50 | 4.00 |
| P3 | 3.00 | 3.00 | 3.00 | 3.00 | 3.00 | 3.00 | 3.00 |

BEFORE LIFT

| | 1 | 2 | 3 | 4 | 5 | 6 | 7 |
|---|---|---|---|---|---|---|---|
| P1 | 31.00 | 31.00 | 31.00 | 31.00 | 31.00 | 31.00 | 31.00 |
| P2 | 22.50 | 22.50 | 22.50 | 22.50 | 22.50 | 22.50 | 22.50 |

ROLLER TO CABLE ANCHOR, inches

| | 1 | 2 | 3 | 4 | 5 | 6 | 7 |
|---|---|---|---|---|---|---|---|
| W1 | 7.50 | 7.50 | 7.50 | 7.50 | 7.50 | 7.50 | 7.50 |
| W2 | 33.50 | 32.50 | 31.88 | 31.25 | 30.25 | 30.25 | 29.50 |

TABLE II-B

CALCULATION OF LIFT EFFICIENCY
LIFT HOLE #2

| | \multicolumn{7}{c}{PIVOT HOLE POSITION} | | | | | | |
|---|---|---|---|---|---|---|---|
| VALUES | #1 | #2 | #3 | #4 | #5 | #6 | #7 |
| h2 − h1 | 25.25 | 25.25 | 25.25 | 25.25 | 25.25 | 25.25 | 25.25 |
| S − m | 47.88 | 48.88 | 47.25 | 46.00 | 43.75 | 42.88 | 41.00 |
| unit | 1.896 | 1.936 | 1.871 | 1.822 | 1.733 | 1.698 | 1.624 | note:
h2 − h1 = net frame lift
S − m = S(measured) − m; The measured net spike lift caused by frame lift and tilt and cable movement.
unit = (S − m)/(h2 − h1)

The information in Table II-B shows that measured net spike lift was in the range of from about 1.62 to about 1.94 units per unit of net frame lift. In the context of the Example, a unit was one inch. As stated previously, the decrease in net spike lift was caused by frame tilt and cable movement which can estimated by use of the calculation program provided in Table III, below.

TABLE III

CALCULATION PROGRAM
(Based on measurements performed before and after lift)

| STEP | | EQUATION | |
|---|---|---|---|
| 1 | b | = | n − h1 |
| 2 | r1 | = | calculated from: frame width, lift pivot separation and lift arm length |
| 3 | P1 | = | $(r1^2 - b^2)^{0.5}$ |
| 4 | P2 | = | P1 − f2 |
| 5 | tan Θ | = | b ÷ P1 |
| 6 | Θ | = | inverse tan Θ |
| 7 | a | = | P2 − d1 |
| 8 | g | = | k − j1 |
| 9 | tan Φ | = | g ÷ a |
| 10 | Φ | = | inverse tan Φ |
| 11 | r2 | = | g ÷ sin Φ |
| 12 | f | = | j1 − h1 |
| 13 | tan τ | = | d1 ÷ f |
| 14 | τ | = | inverse tan τ |
| 15 | r3 | = | d1 ÷ sin τ |
| 16 | b2 | = | k − h2 |
| 17 | d | = | j2 − h2 |
| 18 | cos μ | = | d ÷ r3 |
| 19 | μ | = | inverse cos μ |
| 20 | Δ | = | μ − τ |
| 21 | Wo | = | W2 − W1 |
| 22 | SL | = | Wo cos Δ |
| 23 | X1 | = | m − h1 |
| 24 | X | = | X1 cos Δ |
| 25 | S | = | h2 + X + SL |

EXAMPLE III

The frame lift and tilt and spike lift for the combination of the tractor and lift apparatus described above was predicted for the seven conditions set forth in Example II, wherein the lift pin was maintained in lift hole two and the guide pin was placed in each of the seven pivot holes. The initial spike position, S1, and lift arm vertical lift, h2, employed in Example II were used in this Example III.

The prediction was made by use of the calculation program provided in Table IV, below. The results of the calculation are provided in Table V-A and Table V-B. The results should be compared to the results shown in Table II-A and Table II-B.

The model of the calculation program in Table IV assumes the cable anchor to be positioned perpendicularly below the cable roller. However, in the apparatus described above, which was employed to obtain the results shown in Table II, the cable anchor was not precisely positioned perpendicularly below the cable roller. Accordingly, steps 47 through 58 in the program, which are used to estimate change in distance between the roller and cable anchor caused by frame lift and tilt, were omitted from the calculations and actual measurements as set out in Table II were employed.

TABLE IV

CALCULATION PROGRAM
(Based on test measurements performed before lift)

| STEP | | EQUATION | |
|---|---|---|---|
| 1 | b | = | n − h1 |
| 2 | r1 | = | calculated from: frame width, lift pivot separation and lift arm length |
| 3 | P1 | = | $(r1^2 - b^2)^{0.5}$ |
| 4 | tan Θ | = | b ÷ P1 |
| 5 | Θ | = | inverse tan Θ |
| 6 | P2 | = | P1 − f2 |
| 7 | b3 | = | h2 − n |
| 8 | sin ρ | = | b3 ÷ r1 |
| 9 | ρ | = | inverse sin ρ |
| 10 | e | = | r1 cos ρ |
| 11 | rc | = | e − f2 |
| 12 | a | = | P2 − d1 |
| 13 | g | = | k − j1 |
| 14 | tan Φ | = | g ÷ a |
| 15 | Φ | = | inverse tan Φ |
| 16 | r2 | = | g ÷ sin Φ |
| 17 | ω(min) | = | inverse cos(rc ÷ r2) |
| 18 | @ ω(min)   μ | = | 0 |
| 19 | b2 | = | k − h2 |
| 20 | r3(min) | = | rc[tan ω(min)] + b2 |
| 21 | f | = | j1 − h1 |
| 22 | tan τ | = | d1 ÷ f |
| 23 | τ | = | inverse tan τ |
| 24 | r3 | = | d1 ÷ sin τ |

NOTE: If r3 is greater than or equal to r3(min), then proceed to calculate ω and μ.

| 25 | Γ | = | inverse tan (b2 ÷ rc) |
| 26 | rb | = | rc ÷ cos Γ |

NOTE: If r3 is greater than or equal to rb, then,

| 27 | μ(max) | = | inverse sin(rc ÷ r3) |
| 28 | @ μ (max), ω | = | 90 degrees |
| 29 | r2 (min) | = | r3[cos μ (max)] − b2 |

NOTE: If r3 is less than rb and r2 is greater than r2(min), then continue.

| 30 | a3 | = | f2 ÷ cos ρ |
| 31 | K1 | = | b2 ÷ r2 |
| 32 | K2 | = | r3 ÷ r2 |
|    | r3 | = | K2 r2 |
| 33 | K3 | = | r3 ÷ cos ρ |
|    | r3 | = | K3 cos ρ |

ALGORITHM

| A | | cos μ | = | d ÷ r3 |
|---|---|---|---|---|
|   |   | d | = | r3 cos μ |
| B |   | d | = | μ ÷ b2 |
| C | ∴ | μ + b2 | = | r3 cos μ |
|   |   | μ | = | r3 cos μ − b2 |
| D |   | sin ω | = | μ ÷ r2 |
|   |   | μ | = | r2 sin ω |
| E | ∴ | r3 cos μ − b2 | = | r2 sin ω |
|   |   | b2 | = | r3 cos μ − r2 sin ω |
| F | ∴ | b2 | = | K2 r2 cos μ − r2 sin ω |
| G |   | b2 ÷ r2 | = | K2 cos μ − sin ω |
| H | ∴ | K1 | = | K2 cos μ − sin ω |
|   |   | K2 cos μ | = | K1 + sin ω |
| I |   | cos μ | = | (K1 + sin ω) ÷ K2 |

BEGIN TRIAL AND ERROR CALCULATION

| 34 | | ASSUME ω | | |
| 35 | calculate cos μ | = | (K1 + sin ω) ÷ K2 |
| 36 | then | μ | = | inverse cos μ |
| 37 | | e2 | = | r3 sin μ |
| 38 | | q | = | e − f2 − e2 |
| 39 | | cos ω | = | q ÷ r2 |
| 40 | | ω | = | inverse cos ω |

REPEAT STEPS 34–40 UNTIL ω CALCULATED IN STEP 40 IS EQUAL TO ω ASSUMED IN STEP 34.
END TRIAL AND ERROR CALCULATION

| 41 | μ | = | r2 sin ω |
| 42 | d | = | μ + b2 |
| 43 | j2 | = | d + h2 |

TABLE IV-continued

CALCULATION PROGRAM
(Based on test measurements performed before lift)

| STEP | EQUATION | | |
|------|----------|---|---|
| 44 | $\cos \mu$ | = | $d \div r3$ |
| 45 | $\mu$ | = | inverse $\cos \mu$ |
| 46 | $\Delta$ | = | $\mu - \tau$ |
| 47 | $\tan \alpha$ | = | $P3 \div (P5 - h1)$ |
| 48 | $\alpha$ | = | inverse $\tan \alpha$ |
| 49 | $r4$ | = | $(P5 - h1) \div \cos \alpha$ |
| 50 | $\beta$ | = | $90 - \Delta - \alpha$ |
| 51 | $y1$ | = | $r4 \sin \beta$ |
| 52 | $i$ | = | $r4 \cos \beta$ |
| 53 | $e1$ | = | $e - P1$ |
| 54 | $y2$ | = | $h2 - P4$ |
| 55 | $y$ | = | $y1 + y2$ |
| 56 | $P6$ | = | $i - P3 - e1$ |
| 57 | $W2$ | = | $(y^2 + P6^2)^{0.5}$ |
| 58 | $W1$ | = | $P5 - P4$ |
| 59 | $Wo$ | = | $W2 - W1$ |
| 60 | $SL$ | = | $Wo \cos \Delta$ |
| 61 | $X1$ | = | $m - h1$ |
| 62 | $X$ | = | $X1 \cos \Delta$ |
| 63 | $S$ | = | $h2 + X + SL$ |

GENERAL COMMENTS WITH REGARD TO TABLE IV

The calculation program in Table IV is considered to produce reliable results within the following limits:

The primary lift angle, $\theta$(theta), is positive and has a value in the range of from 0 to 90 degrees; more particularly, the maximum value of the angle is equal to the inverse tangent (n/P1).

The primary guide angle, $\phi$(phi), is positive and has a value in the range of from 0 to 90 degrees; more particularly the maximum value of the angle is equal to the inverse tangent (k/P2) and preferably the inverse tangent [(k-P4)/P2].

The secondary lift angle, $\rho$(rho), is positive and has a value in the range of from 0 to the inverse tangent [(k-n)/P1).

The secondary guide angle, $\omega$(omega), is positive and has a maximum value of 90 degrees. At the maximum value of the secondary guide angle, the guide pin in pivot hole, C, is on the line passing through center pivot, Pc, perpendicular to the ground and the value of guide pin angle, $\mu$(mu) is at its maximum.

The guide pin angle, $\mu$(mu), is positive and has a minimum value of 0 degrees. At the minimum value of the guide pin angle, $\mu$(mu), the guide pin in pivot hole, C, is on the line passing through lift pin, L, perpendicular to the ground, the value of secondary guide angle, $\omega$(omega), is at its minimum and frame tilt angle, $\Delta$(delta), is negative and has a value equal to lift pin angle, $\tau$(tau).

If the center link radius, r2, is greater than the center arm critical radius, rc, then the minimum secondary guide angle $\omega$(omega-min), is equal to the inverse cosine of the ratio of rc to r2, whereby the guide pin angle, $\mu$(mu), is equal to 0 degrees.

$\omega$(min)=inverse cosine $(rc/r2)$

Furthermore, if guide pin angle, $\mu$(mu), is equal to 0 degrees, then lift pin link, r3, has a minimum value equal to the product of the center arm critical radius, rc, and the tangent of the minimum secondary guide angle, $\omega$(omega-min), plus the difference, b2, between the center pivot, Pc, height, k, and the lift pin, L, height, h2.

$r3(min)=rc[\tangent \omega(min)]+b2$

If the lift pin link, r3, is greater than slant radius, rb, then the maximum guide pin angle, $\mu$(max), is equal to the inverse sine of the ratio of center arm critical radius, rc, to lift pin link, r3, whereby the secondary guide angle, $\omega$(omega), is 90 degrees and the minimum length of the center arm radius, r2(min), is equal to the product of the lift pin link, r3, and the cosine of maximum guide pin angle, $\mu$(max), minus the difference, b2, between the distance, k, from the ground to center pivot, Pc, and the distance, h2, from round to lift pin, L.

$\Gamma$=inverse $\tan (b2 \div rc)$ $rb=rc \div \cos \Gamma$

NOTE: If r3 is greater than or equal to rb, then, $\mu$(max)=inverse $\sin(rc \div r3)$ @$\mu$ (max), $\omega$=90 degrees r2 (min)=r3[$\cos \mu$ (max)]-b2

TABLE V-A

CALCULATION OF FRAME TILT & LOAD LIFT UTILIZING
CALCULATION PROGRAM IN TABLE IV STEPS 1-46, 60-63
LIFT HOLE #2

| | PIVOT HOLE | | | | | | |
|---|---|---|---|---|---|---|---|
| VALUES | #1 | #2 | #3 | #4 | #5 | #6 | #7 |
| h1 | 7.75 | 7.75 | 7.75 | 7.75 | 7.75 | 7.75 | 7.75 |
| b | 12.75 | 12.75 | 12.75 | 12.75 | 12.75 | 12.75 | 12.75 |
| r1 | 34.08 | 34.08 | 34.08 | 34.08 | 34.08 | 34.08 | 34.08 |
| P1 | 31.61 | 31.61 | 31.61 | 31.61 | 31.61 | 31.61 | 31.61 |
| $\tan \Theta$ | 0.403 | 0.403 | 0.403 | 0.403 | 0.403 | 0.403 | 0.403 |
| $\Theta$ | 21.967 | 21.967 | 21.967 | 21.967 | 21.967 | 21.967 | 21.967 |
| f2 | 8.5 | 8.5 | 8.5 | 8.5 | 8.5 | 8.5 | 8.5 |
| P2 | 23.11 | 23.11 | 23.11 | 23.11 | 23.11 | 23.11 | 23.11 |
| b3 | 12.5 | 12.5 | 12.5 | 12.5 | 12.5 | 12.5 | 12.5 |
| $\sin \rho$ | 0.367 | 0.367 | 0.367 | 0.367 | 0.367 | 0.367 | 0.367 |
| $\rho$ | 21.517 | 21.517 | 21.517 | 21.517 | 21.517 | 21.517 | 21.517 |

TABLE V-A-continued

CALCULATION OF FRAME TILT & LOAD LIFT UTILIZING
CALCULATION PROGRAM IN TABLE IV STEPS 1–46, 60–63
LIFT HOLE #2

| | PIVOT HOLE | | | | | | |
|---|---|---|---|---|---|---|---|
| VALUES | #1 | #2 | #3 | #4 | #5 | #6 | #7 |
| e | 31.705 | 31.705 | 31.705 | 31.705 | 31.705 | 31.705 | 31.705 |
| rc | 23.205 | 23.205 | 23.205 | 23.205 | 23.205 | 23.205 | 23.205 |
| a | 19.11 | 18.61 | 19.11 | 18.61 | 19.11 | 18.61 | 19.11 |
| g | 15.0 | 12.75 | 11.0 | 9.0 | 7.0 | 5.25 | 2.62 |
| tan Φ | 0.785 | 0.685 | 0.576 | 0.484 | 0.366 | 0.282 | 0.137 |
| Φ | 38.129 | 34.416 | 29.925 | 25.809 | 20.118 | 15.754 | 7.807 |
| r2 | 24.294 | 22.559 | 22.05 | 20.672 | 20.352 | 19.336 | 19.289 |
| ω(min) | 18.383 | rc > r2 | rc > r2 | rc > r2 | rc > r2 | rc > r2 | rc > r2 |
| b2 | 1.0 | 1.0 | 1.0 | 1.0 | 1.0 | 1.0 | 1.0 |
| r3(min) | 8.192 | — | — | — | — | — | — |
| f | 11.25 | 13.5 | 15.25 | 17.25 | 19.25 | 21.0 | 23.63 |
| tan τ | 0.356 | 0.333 | 0.262 | 0.261 | 0.208 | 0.214 | 0.169 |
| τ | 19.573 | 18.435 | 14.697 | 14.621 | 11.739 | 12.095 | 9.608 |
| r3 | 11.94 | 14.23 | 15.766 | 17.827 | 19.661 | 21.477 | 23.966 |
| Γ | 2.468 | 2.468 | 2.468 | 2.468 | 2.468 | 2.468 | 2.468 |
| rb | 23.227 | 23.227 | 23.227 | 23.227 | 23.227 | 23.227 | 23.227 |
| μ(max) | rc > r3 | rc > r3 | rc > r3 | rc > r3 | rc > r3 | rc > r3 | 75.523 |
| r2(min) | — | — | — | — | — | — | 4.991 |
| a3 | 9.137 | 9.137 | 9.137 | 9.137 | 9.137 | 9.137 | 9.137 |
| K1 | 0.041 | 0.044 | 0.045 | 0.048 | 0.049 | 0.052 | 0.052 |
| K2 | 0.491 | 0.631 | 0.715 | 0.862 | 0.966 | 1.111 | 1.242 |
| K3 | 12.834 | 15.296 | 16.947 | 19.163 | 21.134 | 23.086 | 25.761 |
| ω | 26.506 | 33.739 | 38.203 | 45.015 | 50.677 | 57.309 | 65.403 |
| u | 10.842 | 12.53 | 13.637 | 14.621 | 15.744 | 16.273 | 17.539 |
| d | 11.842 | 13.53 | 14.637 | 15.621 | 16.744 | 17.273 | 18.539 |
| j2 | 44.842 | 46.53 | 47.637 | 48.621 | 49.744 | 50.273 | 51.539 |
| cos μ | 0.992 | 0.951 | 0.928 | 0.876 | 0.852 | 0.804 | 0.774 |
| μ | 7.343 | 18.052 | 21.817 | 28.805 | 31.61 | 36.461 | 39.327 |
| Δ | -12.227 | -0.383 | 7.12 | 14.184 | 19.871 | 24.366 | 29.719 |
| Wo | 26.0 | 25.0 | 24.38 | 23.75 | 22.75 | 22.75 | 22.0 |
| SL | 25.41 | 24.999 | 24.192 | 23.026 | 21.395 | 20.724 | 19.106 |
| X1 | 17.25 | 17.25 | 17.25 | 17.25 | 17.25 | 17.25 | 17.25 |
| X | 16.858 | 17.25 | 17.117 | 16.724 | 16.223 | 15.714 | 14.981 |
| S | 75.269 | 75.249 | 74.309 | 72.75 | 70.618 | 69.438 | 67.087 |

TABLE V-B

CALCULATION OF LIFT EFFICIENCY
LIFT HOLE #2

| | PIVOT HOLE | | | | | | |
|---|---|---|---|---|---|---|---|
| VALUES | #1 | #2 | #3 | #4 | #5 | #6 | #7 |
| Δ S | -2.389 | -1.369 | -2.059 | -1.75 | -1.868 | -1.558 | -1.087 |
| % | 96.826 | 98.181 | 97.229 | 97.595 | 97.355 | 97.756 | 98.38 |
| h2 – h1 | 25.25 | 25.25 | 25.25 | 25.25 | 25.25 | 25.25 | 25.25 |
| S – m | 50.269 | 50.249 | 49.309 | 47.75 | 45.618 | 44.438 | 42.087 |
| unit | 1.991 | 1.99 | 1.953 | 1.891 | 1.807 | 1.76 | 1.667 |
| TAR | 0.65 | 0.997 | 1.398 | 2.115 | 3.412 | 5.651 | 16.283 |
| TR | 2.971 | 2.25 | 1.776 | 1.347 | 0.952 | 0.682 | 0.303 | note:
Δ S = S(measured) – S(calculated)
% = S(measured)/S(calculated)*100
h2 – h1 = net frame lift
S – m = S(calculated) – m; The calculated net spike lift caused by frame lift and tilt and cable movement.
unit = (S – m)/(h2 – h1)
Tangent Angle Ratio (TAR) = (tanΘtanω)/(tanΦtanρ)
Tilt Ratio (TR) = (Φ/K3), wherein (K3 = r3 ÷ cos ρ)

This Example illustrates the results obtained by holding the lift hole position constant and varying the pivot hole position and thus illustrates the effect of pivot hole position on frame lift and tilt, cable movement and load lift. In general, with lift pin distance, h1, being held constant, it is seen that the vertical lift, j2, of the guide pin increases and that guide pin angle, $\mu$ (mu), also increases, as the vertical distance, j1, of the pivot hole increases. The net result is that frame tilt was caused to change in the positive direction, whereby the load lift, S, especially for positive frame tilt, decreased as the vertical distance, h1, of the lift hole increased.

The information provided in Table V-B compares the measured lift, shown in Table II, with the calculated lift, shown in Table V-A. In all cases the calculated lift is greater than the measured lift. It is noted, however, that the measured lift was in all cases at least about 97 percent of the lift predicted by the calculation program.

The information in Table V-B also shows that calculated net spike lift was in the range of from about 1.67 to about 1.99 units per unit of net frame lift.

Note the lift results, S, calculated for the condition involving the combination of pivot hole 1 and lift hole 2, were substantially the same as the lift results, S, calculated for the condition involving the combination of pivot hole 2 and lift hole 2. In the former case, the frame tilt was −12.227 degrees, in the latter case, there was substantially no tilt (−0.383 degrees), i.e., the lift was substantially vertical. Now consider the lift results, S, calculated for the condition involving the combination of pivot hole 4 and lift hole 2, wherein the frame tilt was +14.184 degrees and the lift, S, was substantially less than the lift, S, calculated for pivot hole 2 and lift hole 2. It would seem that the lift results obtained for pivot hole 1 and pivot hole 4 should be about the same. However, recall that lift, S, involves an element of frame lift and tilt and an element of cable movement. In the situation involving negative tilt (pivot hole 1) the cable roller moved away from the anchor, whereas in the situation involving positive tilt (pivot hole 4) the cable roller moved toward the anchor. Accordingly, cable movement, Wo, for pivot 1 was about 2.25 inches more than cable movement, Wo, for pivot 4. The greater cable movement and the lesser absolute frame tilt of about 2 degrees thus combined to produce about 2.5 inches more lift for pivot hole 1 than for pivot hole 4.

Also consider the results calculated for the combination of pivot hole 2 and lift hole 2 wherein there was substantially no frame tilt (−0.383 degrees). In such a situation, all net frame lift (h2−h1) can be expected to be translated into cable movement (Wo), wherein each unit of net frame lift produces one unit of relative cable movement, and all cable movement can be expected to be translated into vertical load movement (SL). The results shown in Tables V-A and V-B verify the above expressed expectations. Now with regard to the results for pivot hole 2 and lift hole 2 note: (1) that primary lift angle, θ(theta), and secondary lift angle, ρ(rho), are substantially identical; (2) that primary guide angle, φ(phi) and secondary guide angle, ω(omega), are also substantially identical; (3) that guide pin angle, μ(mu), is substantially identical to lift pin angle, π(tau); and (4) that frame tilt angle, Δ(delta), is substantially zero.

Finally, with respect to the results shown in Table V-A, since the location of the lift pin was held constant and since the tractor hydraulics were permitted to operate to the maximum of their range of motion, i.e., the vertical lift of the frame was held constant, the primary lift angle, θ(theta), and secondary lift angle, ρ(rho), were constant. However, since the guide pin was in a different pivot hole, C, for each lift, i.e., the center arm radius, r2, and the lift pin link, r3, changed with each lift, the primary guide angle, φ(phi) and the secondary guide angle, ω(omega), changed with each lift. In this regard, note that the tilt of the frame increased in the positive direction with decreasing primary guide angle and increasing secondary guide angle. Also note that frame tilt was negative when the primary guide angle was greater than the secondary guide angle and that frame tilt was positive when the primary guide angle was less than secondary guide angle.

Based upon the results of this Example, it is seen that the extent of frame tilt can be qualitatively estimated by the ratio of primary guide angle, φ(phi) to K3 (K3=r3÷cos ρ). This ratio, which for convenience is referred to herein as the "Tilt Ratio," obviously, includes the combined effects on frame tilt contributed by lift pin link, r3, secondary lift angle, ρ(rho), and primary guide angle, φ(phi). Each of the above quantities can be determined, and, in fact assigned, prior to lift to enable frame tilt to be qualitatively estimated without need of executing the quantitative approach afforded by application of the calculation program set out in Table IV. From the results it is seen that if the tilt ratio is greater than about 2.2, then frame tilt appears to be negative, but if the tilt ratio is less than about 2.2, then frame tilt appears to be positive.

EXAMPLE IV

The frame lift and tilt, cable movement and load lift for the combination of a lift apparatus, slightly modified from that described above, and the tractor described above was predicted for four conditions wherein the guide pin was maintained in pivot hole two and the lift pins were placed in each of the four lift holes. The initial spike position, S1, and lift arm vertical lift, h2, employed in Example III were used in this Example IV.

The lift apparatus modification was based on widening the apparatus so that the perpendicular distance, P1, from lift pivot, PL, to the plane of the frame center line for the combination of lift hole 2 and pivot hole 2 would be equal to 31 inches. With no other changes to lift apparatus, 3-point connection or lift arm being made, the lift arm radius, r1, was calculated to be about 33.52 inches and the width of the apparatus was calculated to be equal to about 33.32 inches, which is an increase of about 7.32 inches. With the change in width of the apparatus, it is obvious that the separation between each lift arm and its adjacent tractor back tire will be about 13.34 inches.

The net effect of decreasing the lift arm radius, r1, by about 0.56 inches can be determined by comparing data column 2 of Table V-A, above, with data column 2 of Table VI-A, below.

The prediction was made by use of the calculation program provided in Table IV, above. The results of the calculation are provided in Table VI-A and Table VI-B.

The model of the calculation program in Table IV assumes the cable anchor to be positioned perpendicularly below the cable roller. That presumption is employed in this Example IV. Accordingly, steps 48 through 59 in the program, which are used to estimate change in distance between the roller and cable anchor caused by frame lift and tilt, were employed.

TABLE VI-A

CALCULATION OF FRAME TILT & LOAD LIFT UTILIZING
CALCULATION PROGRAM IN TABLE IV STEPS 1–64
PIVOT HOLE #2

| | LIFT HOLE | | | |
|---|---|---|---|---|
| VALUES | #1 | #2 | #3 | #4 |
| h1 | 4.625 | 7.75 | 9.25 | 11.375 |
| b | 15.875 | 12.75 | 11.25 | 9.125 |
| r1 | 33.520 | 33.520 | 33.520 | 33.520 |
| P1 | 29.522 | 31.0 | 31.575 | 32.254 |
| tan Θ | 0.538 | 0.411 | 0.356 | 0.283 |

TABLE VI-A-continued

CALCULATION OF FRAME TILT & LOAD LIFT UTILIZING
CALCULATION PROGRAM IN TABLE IV STEPS 1–64
PIVOT HOLE #2

| | LIFT HOLE | | | |
|---|---|---|---|---|
| VALUES | #1 | #2 | #3 | #4 |
| Θ | 28.268 | 22.357 | 19.611 | 15.797 |
| f2 | 8.5 | 8.5 | 8.5 | 8.5 |
| P2 | 21.022 | 22.5 | 23.075 | 23.754 |
| b3 | 12.5 | 12.5 | 12.5 | 12.5 |
| sin ρ | 0.373 | 0.373 | 0.373 | 0.373 |
| ρ | 21.896 | 21.896 | 21.896 | 21.896 |
| e | 31.102 | 31.102 | 31.102 | 31.102 |
| rc | 22.602 | 22.602 | 22.602 | 22.602 |
| a | 16.522 | 18.0 | 18.575 | 19.254 |
| g | 12.75 | 12.75 | 12.75 | 12.75 |
| tan Φ | 0.772 | 0.708 | 0.686 | 0.662 |
| Φ | 37.657 | 35.311 | 34.466 | 33.513 |
| r2 | 20.87 | 22.058 | 22.53 | 23.093 |
| ω(min) | rc > r2 | rc > r2 | rc > r2 | 11.835 |
| b2 | 1.0 | 1.0 | 1.0 | 1.0 |
| r3(min) | — | — | — | 5.736 |
| f | 16.625 | 13.5 | 12.0 | 9.875 |
| tan τ | 0.271 | 0.333 | 0.375 | 0.456 |
| τ | 15.146 | 18.435 | 20.556 | 24.499 |
| r3 | 17.223 | 14.230 | 12.816 | 10.852 |
| Γ | 2.533 | 2.533 | 2.533 | 2.533 |
| rb | 22.624 | 22.624 | 22.624 | 22.624 |
| μ(max) | rc > r3 | rc > r3 | rc > r3 | rc > r3 |
| r2(min) | — | — | — | — |
| a3 | 9.161 | 9.161 | 9.161 | 9.161 |
| K1 | 0.048 | 0.045 | 0.044 | 0.043 |
| K2 | 0.825 | 0.645 | 0.569 | 0.47 |
| K3 | 18.562 | 15.337 | 13.812 | 11.696 |
| ω | 43.906 | 34.582 | 30.443 | 24.906 |
| u | 14.473 | 12.52 | 11.416 | 9.725 |
| d | 15.473 | 13.52 | 12.416 | 10.725 |
| j2 | 48.473 | 46.52 | 45.416 | 43.725 |
| cos μ | 0.898 | 0.95 | 0.969 | 0.988 |
| μ | 26.058 | 18.181 | 14.358 | 8.774 |
| Δ | 10.912 | −0.254 | −6.199 | −15.721 |
| tan α | 0.183 | 0.226 | 0.255 | 0.312 |
| α | 10.382 | 12.758 | 14.323 | 17.312 |
| r4 | 16.648 | 13.585 | 12.127 | 10.082 |
| β | 68.707 | 77.496 | 81.876 | 88.409 |
| Y1 | 15.511 | 13.263 | 12.005 | 10.078 |
| i | 6.045 | 2.941 | 1.714 | 0.28 |
| e1 | 1.58 | 0.102 | −0.474 | −1.152 |
| Y2 | 19.5 | 19.5 | 19.5 | 19.5 |
| Y | 35.011 | 32.763 | 31.505 | 29.578 |
| P6 | 1.466 | −0.16 | −0.813 | −1.568 |
| W2 | 35.042 | 32.764 | 31.516 | 29.619 |
| W1 | 7.5 | 7.5 | 7.5 | 7.5 |
| Wo | 27.542 | 25.264 | 24.016 | 22.119 |
| SL | 27.044 | 25.263 | 23.875 | 21.292 |
| X1 | 20.375 | 17.25 | 15.75 | 13.625 |
| X | 20.007 | 17.25 | 15.657 | 13.115 |
| S | 80.05 | 75.513 | 72.533 | 67.407 |

TABLE VI-B

CALCULATION OF LIFT EFFICIENCY
PIVOT HOLE #2

| | LIFT HOLE | | | |
|---|---|---|---|---|
| VALUES | #1 | #2 | #3 | #4 |
| h2 − h1 | 28.375 | 25.25 | 23.75 | 21.625 |
| S − m | 55.05 | 50.513 | 47.533 | 42.407 |
| unit | 1.940 | 2.001 | 2.001 | 1.961 |
| TAR | 1.669 | 0.995 | 0.758 | 0.493 |
| TR | 2.029 | 2.302 | 2.495 | 2.865 |

TABLE VI-B-continued

CALCULATION OF LIFT EFFICIENCY
PIVOT HOLE #2

| | LIFT HOLE | | | |
|---|---|---|---|---|
| VALUES | #1 | #2 | #3 | #4 | note:
h2 − h1 = net frame lift
S − m = S(calculated) − m; The calculated net spike lift caused by frame lift and tilt and cable movement.
unit = (S − m)/(h2 − h1)
Tangent Angle Ratio (TAR) = (tanΘtanω)/(tanΦtanρ)
Tilt Ratio (TR) = (Φ/K3), wherein (K3 = r3 ÷ cos ρ)

This Example illustrates the results obtained by holding the pivot hole position constant and varying the lift hole position and thus illustrates the effect of lift hole position on frame lift and tilt, cable movement and load lift. In general, with the position of pivot hole, C, being held constant, it is seen that the vertical lift, j2, of the guide pin decreases and that guide pin angle, μ (mu), also decreases, as the vertical distance, h1, of the lift hole increases. The net result was that frame tilt was caused to change in the negative direction, whereby the load lift, S, decreased as the vertical distance, h1, of the lift hole increased.

As was the case in the previous Example III, note that frame tilt was negative when the primary guide angle was greater than the secondary guide angle and that frame tilt was positive when the primary guide angle was less than secondary guide angle even though the primary lift angle changed and the secondary lift angle was constant. Further note the similarity of results between this Example and Example III regarding the tilt ratio, wherein frame tilt appears to be negative if the tilt ratio is greater than about 2.2, but if the tilt ratio is less than about 2.2, then frame tilt appears to be positive.

Finally, this Example clearly suggests that net load lift is a direct function of primary lift angle.

EXAMPLE V

The frame lift and tilt spike lift for the combination of the tractor and lift apparatus described in Example IV, above, was predicted for two extreme conditions. In one condition, Run 13, the guide pin was placed in pivot hole one and the lift pin was placed in lift hole four. In the second condition, Run 12, the guide pin was placed in pivot hole seven and the lift pin was placed in lift hole one. The initial spike position, S1, and lift arm vertical lift, h2, employed in Example IV were used in this Example V.

The prediction was made by use of the calculation program provided in Table IV, above. The results of the calculation are provided in Table VII-A and Table VII-B.

The model of the calculation program in Table IV assumes the cable anchor to be positioned perpendicularly below the cable roller. That presumption is employed in this Example V. Accordingly, steps 48 through 69 in the program, which are used to estimate change in distance between the roller and cable anchor caused by frame lift and tilt, were employed.

TABLE VII-A

CALCULATION OF FRAME TILT & LOAD LIFT UTILIZING
CALCULATION PROGRAM IN TABLE IV STEPS 1–64
Run #12--LIFT HOLE #1, PIVOT HOLE #7
Run #13--LIFT HOLE #4, PIVOT HOLE #1

| VALUES | RUN #12 | RUN #13 |
|---|---|---|
| h1 | 4.625 | 11.375 |
| b | 15.875 | 9.125 |
| r1 | 33.520 | 33.520 |
| P1 | 29.522 | 32.254 |
| tan θ | 0.538 | 0.283 |
| θ | 28.268 | 15.797 |
| f2 | 8.5 | 8.5 |
| P2 | 21.022 | 23.754 |
| b3 | 12.5 | 12.5 |
| sin ρ | 0.373 | 0.373 |
| ρ | 21.896 | 21.896 |
| e | 31.102 | 31.102 |
| rc | 22.602 | 22.602 |
| a | 17.022 | 19.754 |
| g | 2.62 | 15.0 |
| tan Φ | 0.154 | 0.759 |
| Φ | 8.750 | 37.211 |
| r2 | 17.222 | 24.803 |
| ω min | rc > r2 | 24.324 |
| b2 | 1.0 | 1.0 |
| r3 (min) | rc > r2 | 11.216 |
| f | 26.755 | 7.625 |
| tan τ | 0.150 | 0.525 |
| τ | 8.503 | 27.681 |
| r3 | 27.052 | 8.611 |
|  | — | r3 < r3 (min) |
| Γ | 2.533 | 2.533 |
| rb | 22.624 | 22.624 |
| μ(max) | 56.666 | r3 < rc |
| r2 min | 13.866 |  |
| a3 | 9.161 | 9.161 |
| K1 | 0.058 | 0.040 |
| K2 | 1.571 | 0.347 |
| K3 | 29.155 | 9.280 |
| ω | 81.824 | <24.324 |
| μ | 48.154 | <0.00 |
| u | 17.047 |  |
| d | 18.047 |  |
| j2 | 51.047 |  |
| cos μ | 0.667 |  |
| μ | 48.154 |  |
| Δ | 39.651 | <0.00 |
| tan α | 0.183 | 0.312 |
| α | 10.382 | 17.312 |
| r4 | 16.648 | 10.082 |
| β | 39.967 |  |
| Y1 | 10.693 |  |
| i | 12.759 |  |
| e1 | 1.580 | −1.152 |
| Y2 | 19.5 | 19.5 |
| Y | 30.193 |  |
| P6 | 8.179 |  |
| W2 | 31.282 |  |
| W1 | 7.5 | 7.5 |
| Wo | 23.782 |  |
| SL | 18.311 |  |
| X1 | 20.375 | 13.625 |
| X | 15.688 |  |
| S | 66.998 |  |

TABLE VII-B

CALCULATION OF LIFT EFFICIENCY

| Values | #12 | #13 |
|---|---|---|
| h2-h1 | 28.375 |  |
| S-m | 41.998 |  |
| unit | 1.480 |  |
| TAR | 60.485 | <0.419 |
| TR | 0.3 | 4.01 | note:
h2-h1 = net frame lift
S-m = S (calculated)-m; The calculated net spike lift caused by frame lift and tilt and cable movement.
unit = (S-m)/(h2-h1)
Tangent Angle Ratio (TAR) = (tanθtanω)/(tanΦtanρ)
Tilt Ratio (TR) = (Φ/K3), wherein (K3 = r3 ÷ cos ρ)

In this Example, the calculation program was not applicable to run 13 because the actual value of the lift pin link, r3, was less than the minimum value required to produce a value of at least 0 degrees for guide pin angle, μ. With respect to run 13, it can, therefor, be concluded that secondary guide angle, ω, has a value of less than 24.324 degrees; that guide pin angle, μ, has a negative value; and that the frame tilts in a negative direction, wherein the degree of tilt thereof is greater than 27.681 degrees, which is the value of lift pin angle, π.

The conclusions drawn in the previous examples with regard to the ability to predict positive and negative frame tilt depending upon the relative values of the primary guide angle and the secondary guide angle, and as predicted by the tilt ratio apply with equal facility to this example.

Having thus described the invention that which is claimed is:

1. A method of lifting a load, said method being comprised of the steps of:

providing a planar frame having a front side and a back side, said frame being comprised of a left side rail, a right side rail, a top rail, a bottom rail, a load support rail positioned in the plane of said frame intermediate said left side rail and said right side rail, a load handling assembly, a guide pivot assembly and a load connector assembly;

said left side rail of said frame having a first outer surface, a first inner surface and a first lift pin attached to said left side rail;

said right side rail of said frame having a second outer surface, a second inner surface and a second lift pin attached to said right side rail;

said load support rail comprises a front side, a back side, an upper end, and a lower end wherein said front side of said load support rail and said front side of said frame face in the same direction, said lower end of said load support rail is perpendicular and rigidly attached to said bottom rail of said frame, and said upper end of said load support rail has an opening therein between said front side and said back side and is rigidly attached to said top rail of said frame;

said load handling assembly, comprising a load mover having attached thereto a load carrier and a load attachment means, is slidably connected to said front side of said load support rail; and said guide pivot assembly, comprising at least one guide pin plate having removably connected thereto a guide pin, is fixedly attached to said back side of said load support rail at a position intermediate said bottom rail of said frame and said opening in said load support rail;

said load connector assembly, comprising a flexible member having an anchor end and a load end, is positioned to extend from said front side of said load support rail to said back side of said load support rail by passing through said opening with said load end being connected to said load attachment means of said load handling assembly;

providing a first lift arm having a first end and a second end; a second lift arm having a first end and a second end; and a guide arm having a first end and a second end;

rotatably attaching said first end of said first lift arm to a first fixed pivot located in a first horizontal plane;

rotatably attaching said first end of said second lift arm to a second fixed pivot, wherein said second fixed pivot is located in said first horizontal plane at a fixed distance from said first fixed pivot and further wherein the perpendicular distance in said first horizontal plane from said first fixed pivot to any plane perpendicular to said first horizontal plane is equal to the perpendicular distance in said first horizontal plane from said second fixed pivot to said plane perpendicular to said first horizontal plane;

rotatably attaching said first end of said guide arm to a third fixed pivot located in a second horizontal plane, wherein said second horizontal plane is parallel to and vertically above said first horizontal plane and further wherein the distance from said first fixed pivot to said third fixed pivot is equal to the distance from said second fixed pivot to said third fixed pivot;

positioning said planar frame in intersecting relationship with said first horizontal plane and said second horizontal plane with said back side of said frame facing said first fixed pivot, said second fixed pivot and said third fixed pivot;

rotatably attaching said second end of said first lift arm to said first lift pin;

rotatably attaching said second end of said second lift arm to said second lift pin;

rotatably attaching said second end of said guide arm to said guide pin;

attaching said anchor end of said flexible connector to a fixed anchor;

supporting said load on said load carrier;

applying upward forces to said first lift pin and said second lift pin whereby said first lift pin and said second lift pin are caused to rotate about said first fixed pivot and said second fixed pivot by said first lift arm and said second lift arm, and said guide pin is caused to rotate about said third fixed pivot by said guide arm, to thereby cause said load support rail to rise against said flexible connector in said opening, and said flexible connector, being restrained from movement by a fixed anchor, causes said load handling assembly to vertically lift said load by an amount less than, equal to or greater than the vertical lift of said first and said second lift pins.

2. The method of claim 1 comprising attaching to and extending said first lift pin outwardly from said first outer surface in said plane of said frame, attaching to and extending said second lift pin outwardly from said second outer surface in said plane of said frame; equipping said guide arm with an adjusting means for varying the distance between said first end of said guide arm and said second end of said guide arm; setting the perpendicular distance in said second horizontal plane from said third fixed pivot to said plane perpendicular to said first horizontal plane to a value less than the perpendicular distance in said first horizontal plane from said first fixed pivot and said second fixed pivot to said plane perpendicular to said first horizontal plane and positioning said plane perpendicular to said first horizontal plane between said back side of said frame and said first, said second, and said third fixed pivots.

3. The method of claim 2 wherein said distance between said first end of said guide arm and said second end of said guide arm is varied with said adjusting means until said frame is positioned in perpendicular relationship with said first horizontal plane and said second horizontal plane.

4. The method of claim 3 comprising setting the distance from said first end of said second lift arm to said second end of said second lift arm to a value equal to the distance from said first end of said first lift arm to said second end of said first lift arm.

5. The method of claim 4 comprising positioning and rotatably attaching a sheave in said opening in said load support rail transverse to said plane of said frame.

6. The method of claim 5 comprising replacing said flexible member with a cable.

7. The method of claim 6 comprising passing said cable over said sheave in said opening between said front side and said back side of said load support rail.

8. The method of claim 7 comprising connecting said load attachment means as a bail to said load mover at the top thereof.

9. The method of claim 8 comprising vertically attaching two of said guide pin plates in parallel alignment to said back side of said load support rail and removably connecting said guide pin at each end thereof to said guide pin plates.

10. The method of claim 9 comprising connecting said first lift pin and said second lift pin to said left side rail and said right side rail at positions equidistant from and below said first horizontal plane.

11. The method of claim 10 comprising connecting said guide pin to said guide pin plates at a position between said first horizontal plane and said second horizontal plane.

12. The method of claim 11 comprising extending said cable from said sheave adjacent said back side of said load support rail and passing said cable between said guide pin and said back side of said load support rail to said fixed anchor.

13. The method of claim 12 comprising attaching said fixed anchor to said frame thereby preventing said load mover from sliding on said load rail whereby vertical lift of said load is an amount equal to or less than the vertical movement of said lift pins.

14. The method of claim 12 comprising causing said load mover to slide on said load rail by not attaching said fixed anchor to said frame whereby vertical lift of said load is an amount equal to or greater than the vertical movement of said lift pins.

15. The method of claim 14 comprising employing the three-point connection of a farm tractor as said first fixed pivot, said second fixed pivot and said third fixed pivot and employing said farm tractor as said fixed anchor.

16. The method of claim 15 comprising applying said upward forces to said first lift pin and said second lift pin by said three-point connection equipment of said tractor applying upward forces to said first lift arm and to said second lift arm.

17. The method of claim 16 wherein the positions of said lift pins on said frame and said guide pin in said guide pin plate are adjusted to cause said top rail of said frame, after having lifted said load, to tilt away from said fixed pivots or toward said fixed pivots or to cause said top rail not to tilt either away from or toward said fixed pivots.

18. The method of claim 17 comprising employing a spike as said load carrier and rigidly attaching and perpendicularly extending said spike outwardly from said load mover from said front side of said load support rail.

19. The method of claim 18 comprising employing a round bale of hay as said load.

20. The method of claim 19 wherein the positions of said lift pins on said frame and said guide pin in said guide pin plate are adjusted to cause said bale of ha to rise substantially vertically by an amount substantially equal to two times the vertical rise of said lift pins.

* * * * *